(12) United States Patent
Kalsi et al.

(10) Patent No.: US 10,540,420 B2
(45) Date of Patent: Jan. 21, 2020

(54) ACCELERATOR FOR MATRIX DECOMPOSITION

(71) Applicant: Intel Corporation, Santa Clara, CA (US)

(72) Inventors: Gurpreet Singh Kalsi, Bengaluru (IN); Om Ji Omer, Bengaluru (IN); Santhosh Kumar Rethinagiri, Bengaluru (IN); Anish N K, Puducherry (IN); Dipan Kumar Mandal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 15/858,788

(22) Filed: Dec. 29, 2017

(65) Prior Publication Data

US 2019/0042539 A1    Feb. 7, 2019

(51) Int. Cl.
*G06F 17/16* (2006.01)
*G06F 7/544* (2006.01)

(52) U.S. Cl.
CPC ............ *G06F 17/16* (2013.01); *G06F 7/5443* (2013.01)

(58) Field of Classification Search
None
See application file for complete search history.

(56) References Cited

U.S. PATENT DOCUMENTS

| | | | | |
|---|---|---|---|---|
| 5,787,025 | A * | 7/1998 | Muwafi | G06F 7/48 708/231 |
| 8,473,540 | B1 * | 6/2013 | Rao | H04B 7/0854 708/201 |
| 8,510,364 | B1 * | 8/2013 | Rao | G06F 17/12 708/201 |
| 2008/0154996 | A1 * | 6/2008 | Yancey | G06F 15/7867 708/130 |
| 2018/0210860 | A1 * | 7/2018 | Jamsek | G06F 17/16 |
| 2019/0042195 | A1 * | 2/2019 | Kalsi | G06F 7/527 |
| 2019/0042539 | A1 * | 2/2019 | Kalsi | G06F 17/16 |

* cited by examiner

*Primary Examiner* — David H Malzahn
(74) *Attorney, Agent, or Firm* — Schwegman Lundberg & Woessner, P.A.

(57) ABSTRACT

Systems and methods for a hardware accelerated matrix decomposition matrix decomposition circuit are described herein. This matrix decomposition circuit splits matrix decomposition operations into parallel operation circuits and serial operation circuits, and joins the parallel and serial operation circuits using specific dependency handling logic for efficient parallel execution. This provides fast matrix decomposition with low power consumption, reduced memory footprint, and reduced memory bandwidth.

21 Claims, 25 Drawing Sheets

ACCELERATOR FOR MATRIX DECOMPOSITION

TECHNICAL FIELD

Embodiments described herein generally relate to computer hardware architecture, and more specifically to an accelerator for matrix decomposition.

BACKGROUND

Increasingly, there is a demand for solutions to complex linear systems. These solutions are used in various applications, such as computer vision (simultaneous localization and mapping (SLAM), robotics, drones etc.), machine learning, control-systems, big-data analytics, and other applications. The solutions to these complex linear systems may include a matrix decomposition operation. Matrix decomposition operations are computationally intensive. For example, matrix decomposition complexity may be cubic, such that, for N elements, processing involves $N^3$ computations. Such processing complexity often consumes substantial power. Matrix decomposition operations also require substantial memory bandwidth, resulting in a substantial time delay in computing the solution (e.g., large latency). The large latency may significantly affect the performance of various applications, such as slowing camera pose estimation or SLAM calculations. In addition to the power used in the matrix decomposition mathematical operations, matrix decomposition operations also require substantial energy to execute the large number of memory accesses. When implemented on a software kernel running on a general purpose processor (e.g., central processing unit (CPU)), the matrix decomposition operations include unorganized memory access patterns (e.g., for triangular matrices) and serial operation dependencies, which further increase latency and power consumption. The high latency and high energy consumption may substantially reduce the performance of time-dependent applications, such as AR or VR applications.

DESCRIPTION OF EMBODIMENTS

A solution to the technical problems facing matrix decomposition operations includes a hardware-accelerated solution for matrix decomposition operations. In an embodiment, this hardware-accelerated matrix decomposition solution may be implemented on a hardware accelerated optimized microarchitecture (i.e. specialized circuitry). This hardware-accelerated matrix decomposition embodiment splits matrix decomposition operations into parallel operation circuits (e.g., for high-bandwidth dot product operations) and serial operation circuits (e.g., for high-latency operations), and joins the parallel and serial operation circuits using dependency handling logic for efficient parallel execution. This provides fast and low power matrix decomposition with a reduced memory footprint and a reduced memory bandwidth.

Figure 1:
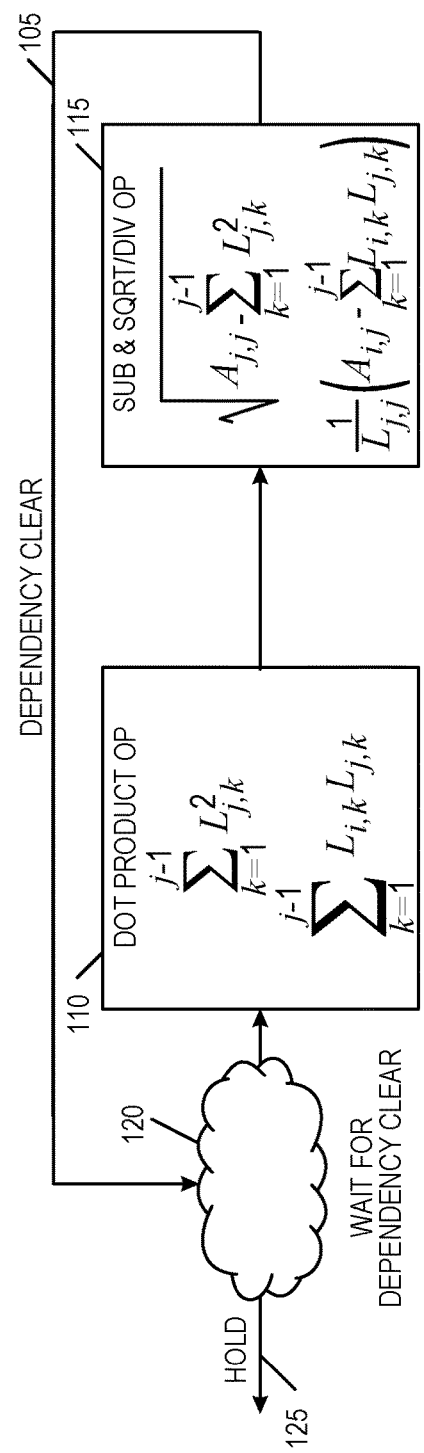
FIG. 1 illustrates a first matrix decomposition block diagram according to an embodiment.
Figure 2:
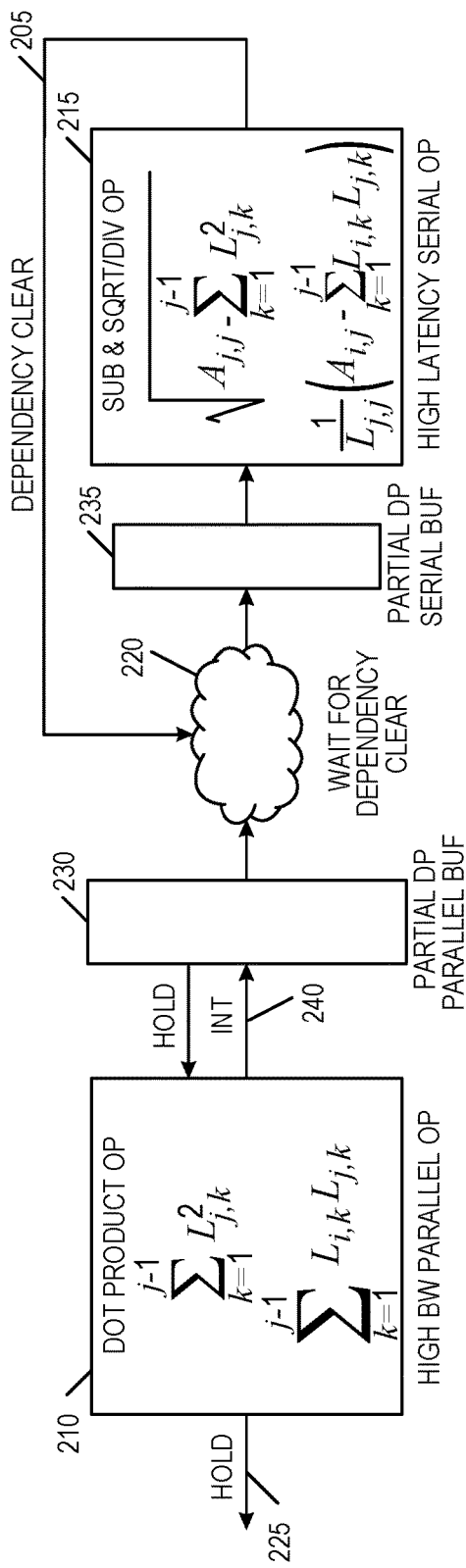
FIG. 2 illustrates a second matrix decomposition block diagram according to an embodiment.
Figure 4B:
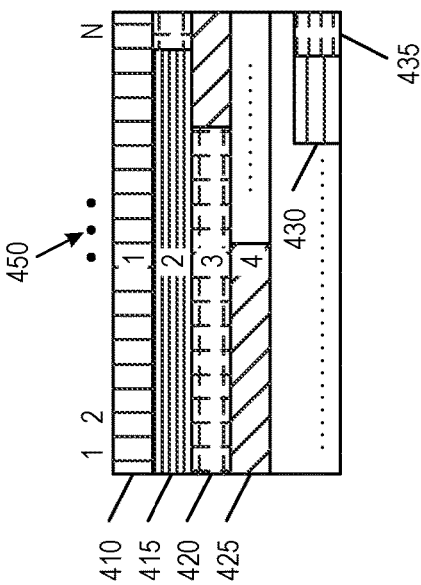
FIGS. 4A-4B are block diagrams illustrating a matrix memory layout according to an embodiment.
Figure 4A:
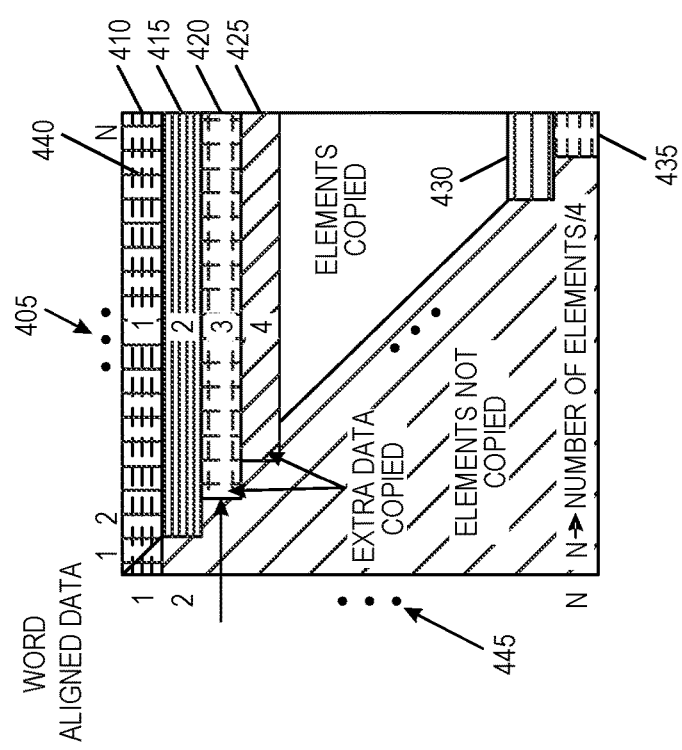

This hardware-accelerated matrix decomposition embodiment provides various features. This hardware-accelerated matrix decomposition provides matrix decomposition that is suitable for various decomposition techniques, such as Takagi decomposition (e.g., for symmetric square matrices) or Cholesky decomposition (e.g., for symmetric positive definite matrices). The hardware-accelerated matrix decomposition separates and manages high-latency serial operations and high-bandwidth dot product operations for efficient parallel execution, such as shown in FIGS. 1-2. Additionally, despite a serial dependency in alternative matrix decomposition computations, the hardware-accelerated matrix decomposition improves scaling of computations based on larger matrices through the use of improved dependency clear circuit, such as shown in FIGS. 1-2. The hardware-accelerated matrix decomposition embodiment reduces memory footprint by providing the ability to read an input from a memory and write the output matrix elements in-place back to the same memory. The embodiment provides the ability to read or write matrix data in triangular storage format or compressed linear storage format, such as shown in FIGS. 4A-4B. The embodiment reduces memory footprint by providing the ability to read an input from a memory and write the output matrix elements back to the same memory (e.g., in-place storage).

The hardware-accelerated matrix decomposition embodiment provides a scalable design to achieve lower latency and higher throughput with reduced memory bandwidth (e.g., using fewer memory accesses), such as shown in FIGS. 5A-6B. The embodiment provides improved computation management and local buffering, which reduces memory access and increases performance, such as shown in FIGS. 5A-6B. The embodiment provides support for partial execution (e.g., stop and resume functionality), which provides the ability to manage pre-emption and software and host controllability for large dimension matrix decomposition, such as shown in FIG. 7. The embodiment also provides a configurable design for varying memory interface bit-width and compute resources, such as shown in FIG. 7.

The following description and the drawings illustrate example embodiments, though other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a block diagram illustrating a first matrix decomposition system 100 according to an embodiment. Block diagram 100 shows a first example of dependency-clearing circuit for Cholesky matrix decomposition. The dependency clear circuit may provide an indication that the dependency is clear, thus clearing the pipeline for the next operation. The Cholesky decomposition is useful to solve linear equations. For example, if matrix A is a symmetric and positive-definite matrix, then linear equation A x=B may be solved by first computing the decomposition $A=LL^T$, then solving L y=B by forward substitution, and finally solving $L^T x=y$ by backward substitution. This Cholesky decomposition determines elements for each row index i and column index j. A Cholesky decomposition of $A=LL^T$ includes determining elements of matrix L as follows:

$$\text{for } i = j: \quad L_{j,j} = \sqrt{A_{j,j} - \sum_{k=1}^{j-1} L_{j,k}^2}$$

$$\text{for } i < j: \quad L_{i,j} = \frac{1}{L_{j,j}}\left(A_{i,j} - \sum_{k=1}^{j-1} L_{i,k} L_{j,k}\right)$$

$$\text{for } i > j: \quad L_{i,j} = 0$$

This Cholesky decomposition assume the matrix to be lower triangular, which is captured for i>j above.

Another technique to decompose (e.g., factorize) a complex symmetric matrix is Takagi's factorization (e.g., Takagi decomposition). If matrix A is a complex symmetric matrix, its Takagi factorization has the form $A=VDV^T$. Matrix V is a unitary matrix, and the columns of matrix V may be referred to as Takagi vectors. Matrix D is a diagonal singular value matrix, and the elements of matrix D may be referred to as $D_{i,j}$ for each row index i and column index j. Elements of matrix V may be determined as follows:

$$\text{for } i = j: \quad D_{j,j} = A_{j,j} - \sum_{k=1}^{j-1} V_{j,k}^2 \quad V_{i,j} = 1$$

$$\text{for } i < j: \quad D_{i,j} = 0 \quad V_{i,j} = \frac{1}{D_{j,j}}\left(A_{i,j} - \sum_{k=1}^{j-1} V_{i,k} V_{j,k}\right)$$

$$\text{for } i > j: \quad D_{i,j} = 0 \quad V_{i,j} = 0$$

The first matrix decomposition system 100 is described using a Cholesky decomposition, however a Takagi decomposition or other decomposition may be used.

As shown in FIG. 1, block diagram 100 includes a Cholesky dot product operation circuit 110 followed by a Cholesky subtraction and square root or division operation circuit 115. In operation, the dot product operation circuit 110 sends its output to the square root or division operation circuit 115, which sends a dependency clear indication 105 to a wait for dependency clear circuit 120. The wait for dependency clear circuit 120 may also send a hold indication 125 to another processing circuit to hold further processing while the decomposition is being executed. Because subsequent operations of the dot product operation circuit 110 take inputs from the square root or division operation circuit 115, the high-latency serial operation of the square root or division operation circuit 115 slows the overall progress of the matrix decomposition.

FIG. 2 illustrates a second matrix decomposition block diagram 200 according to an embodiment. Block diagram 200 includes a Cholesky dot product operation circuit 210 followed by a Cholesky subtraction and square root or division operation circuit 215. In addition, block diagram 200 also includes a partial dot product buffer 230 that retains multiple outputs of the dot product operation circuit 210, enabling multiple high-bandwidth parallel operations. Because the square root or division operation circuit 215 involves a high-latency serial operation, circuit 215 may send a dependency clear indication 205 to a wait for dependency clear circuit 220, which may move appropriate data from the partial dot product buffer 230 to a partial dot product serial buffer 235 for the next operation of the square root or division operation circuit 215. This configuration allows one or more dot product operation circuits 210 to start computing the next set of input data for circuit 215 while circuit 215 is completing earlier computations, thus reducing overall latency. In an example, the one or more dot product operation circuits 210 may be implemented as one or more multiply and accumulate (MAC) circuits, such as shown in FIG. 7.

Figure 3:
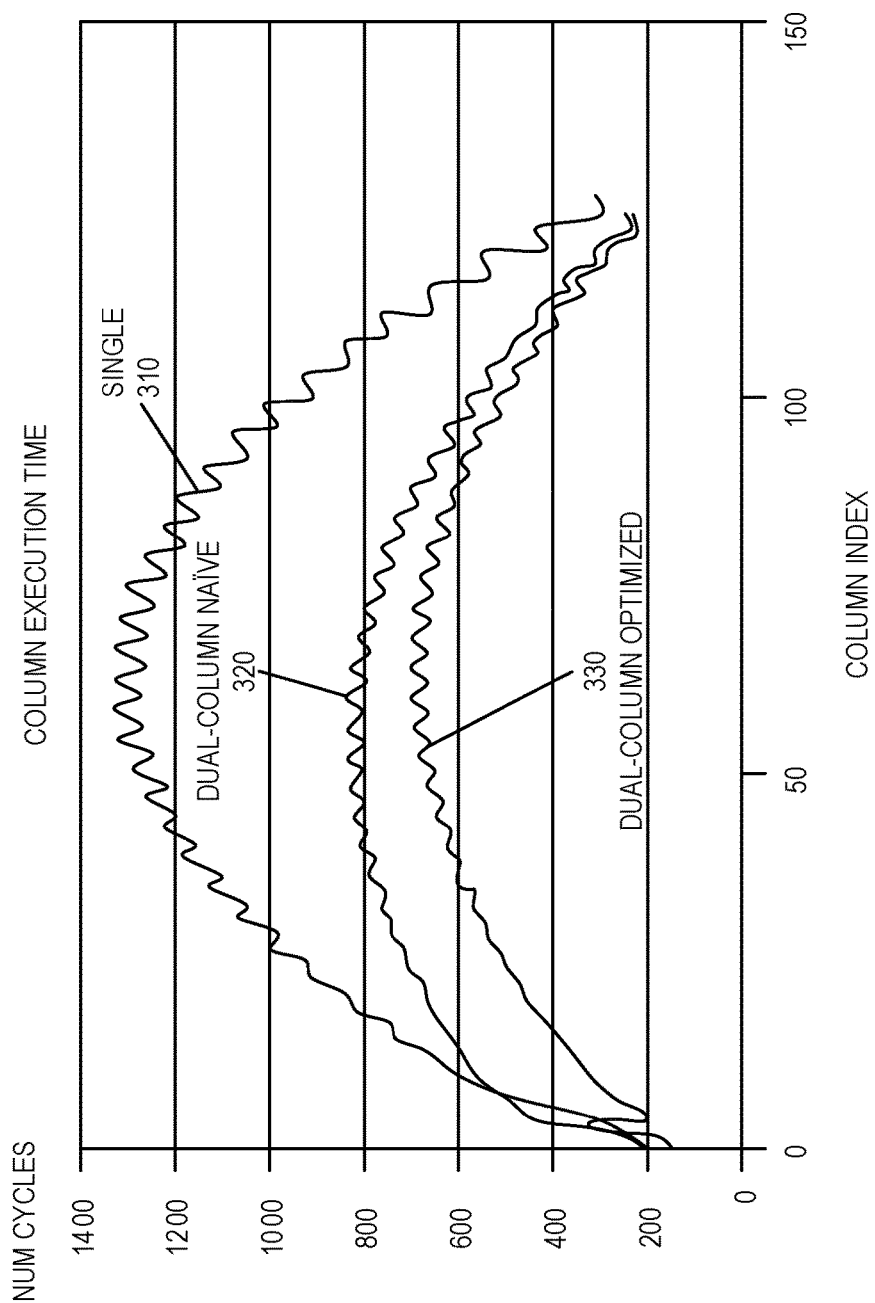
FIG. 3 is a column execution time graph according to an embodiment.

FIG. 3 is a column execution time graph 300 according to an embodiment. Graph 300 shows matrix element computation time for an example matrix A that includes 128×128 elements. The parallel and serial dependency shown in FIGS. 1-2 affect the latency of the operation. This dependency may restrict linear scaling of performance with parallel execution. The separation circuit shown in FIG. 2 improves the performance of these operations. More specifically, the computation separation matrix decomposition circuit embodiment shown in FIG. 7 improves dependency management and frees-up MAC circuits to start operations on new set of data while a computation-separation and serial-compute circuit is performing operations on previous elements. The dependency may be improved further by implementing multiple column processing shown in FIG. 7. As shown in graph 300, single column operations 310 may be improved to dual-column naïve 320 (e.g., no dependency clear circuit), which may be further improved to dual-column optimized 330 (e.g., using dependency clear circuit). In the example shown in FIG. 3, the dual-column naïve 320 may provide a 1.58× improvement over single column operations 310, and dual-column optimized 330 may provide a 1.96× improvement over single column operations 310.

FIGS. 4A-4B are block diagrams illustrating a matrix memory layout 400 according to an embodiment. 4A shows a triangular storage format of memory for an upper triangular matrix A, including rows 410, 415, 420, 425, 430, and 435. FIG. 4B shows the same elements of matrix A, including rows 410, 415, 420, 425, 430, and 435, stored in a compressed linear format. The compressed linear storage of triangular memory reduces the memory footprint and reduces power required for memory storage and retrieval. The embodiment provides the ability to read from memory or write to memory using triangular storage format or compressed linear format. For example, an input matrix may be read from triangular storage format and written in compressed linear format, or may be read from compressed linear storage format and written in triangular storage format. The embodiment also provides in-place storage, such as the ability to read from a memory address and write output data back to that memory for any combination of triangular storage format and compressed linear storage format.

Figures 5A, 5B:
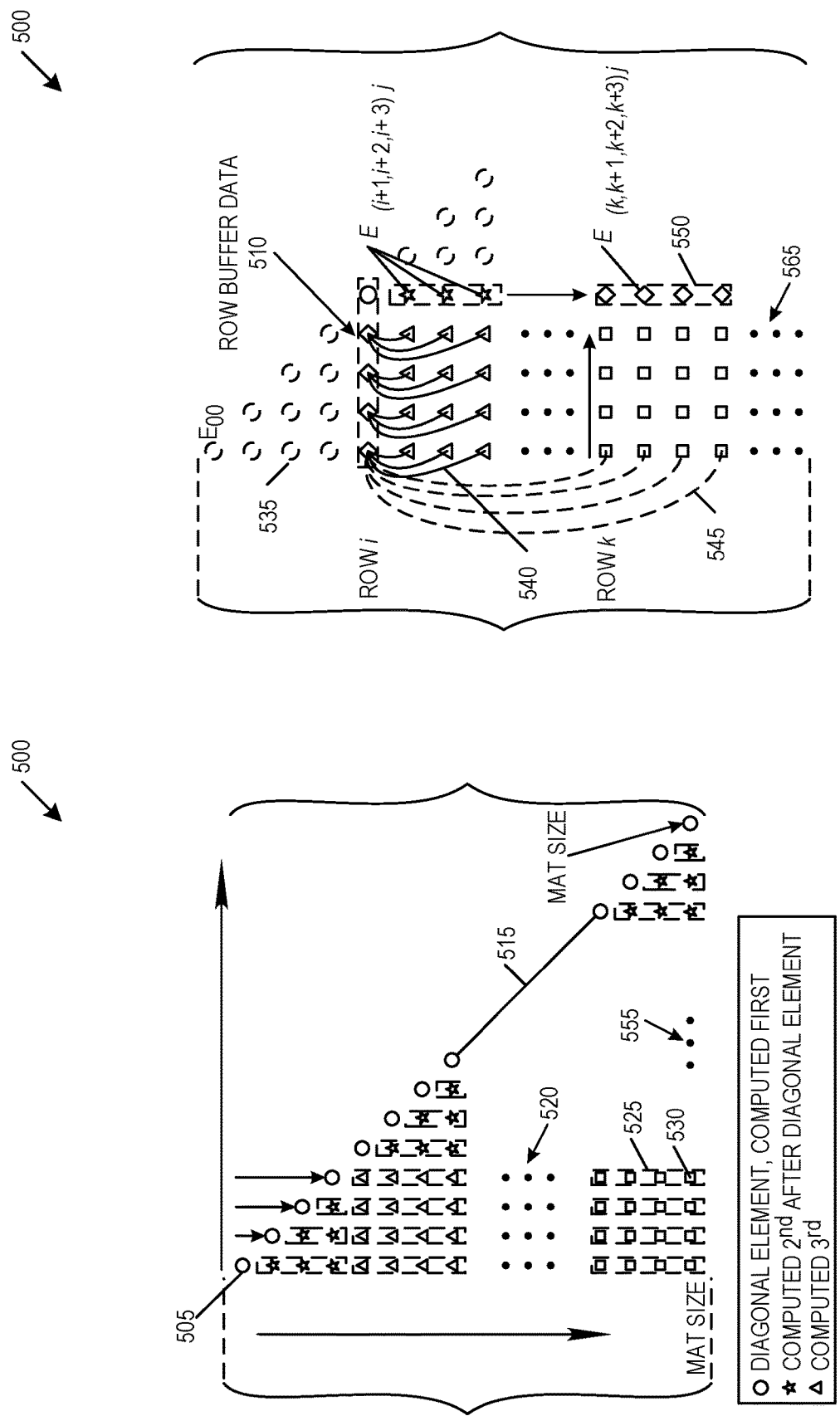
FIGS. 5A-5B are block diagrams illustrating single-column matrix computations according to an embodiment.

FIGS. 5A-5B are block diagrams illustrating single-column matrix computations 500 according to an embodiment. In particular, FIG. 5A shows matrix element computation order, whereas FIG. 5B shows row buffer based computation. The matrix decomposition performance is improved by traversing matrix elements in such a way that input data may be reused for multiple operations. As discussed above, matrix decomposition may be divided into parallel and serial operations. The parallel matrix decomposition operations continue to calculate and accumulate dot product outputs, whereas serial matrix decomposition operations calculate matrix element values using square-root or division (e.g., based on element position).

In an example, the execution order of decomposition operations is selected to match with memory data layout. Column computation starts from a first column (e.g., a least column number) and continues operations on each subsequent column until reaching the end of matrix. Within each column, computation operations are traversed from first diagonal element 505 to last element of that column 530. As shown in FIG. 5A, elements may be grouped into 4 or 8 elements based on a width of a memory read. For example, 128 bits may be grouped into 4 elements, or 256 bits may be grouped into 8 elements. As shown in FIG. 5A, the diagonal element 505 in a column is computed first followed by subsequent elements in same column in the group of 4, where any circuit of fewer than 4 elements may be handled using a similar set of steps. FIG. 5B shows the pattern followed for dot product computation. In particular, FIG. 5B shows that a row corresponding to diagonal element is locally buffered as row buffer data 510 while computing each diagonal element, thus reducing memory reads. Each buffered row is then multiplied with each set of input data during column element computation operations.

Figures 6A, 6B:
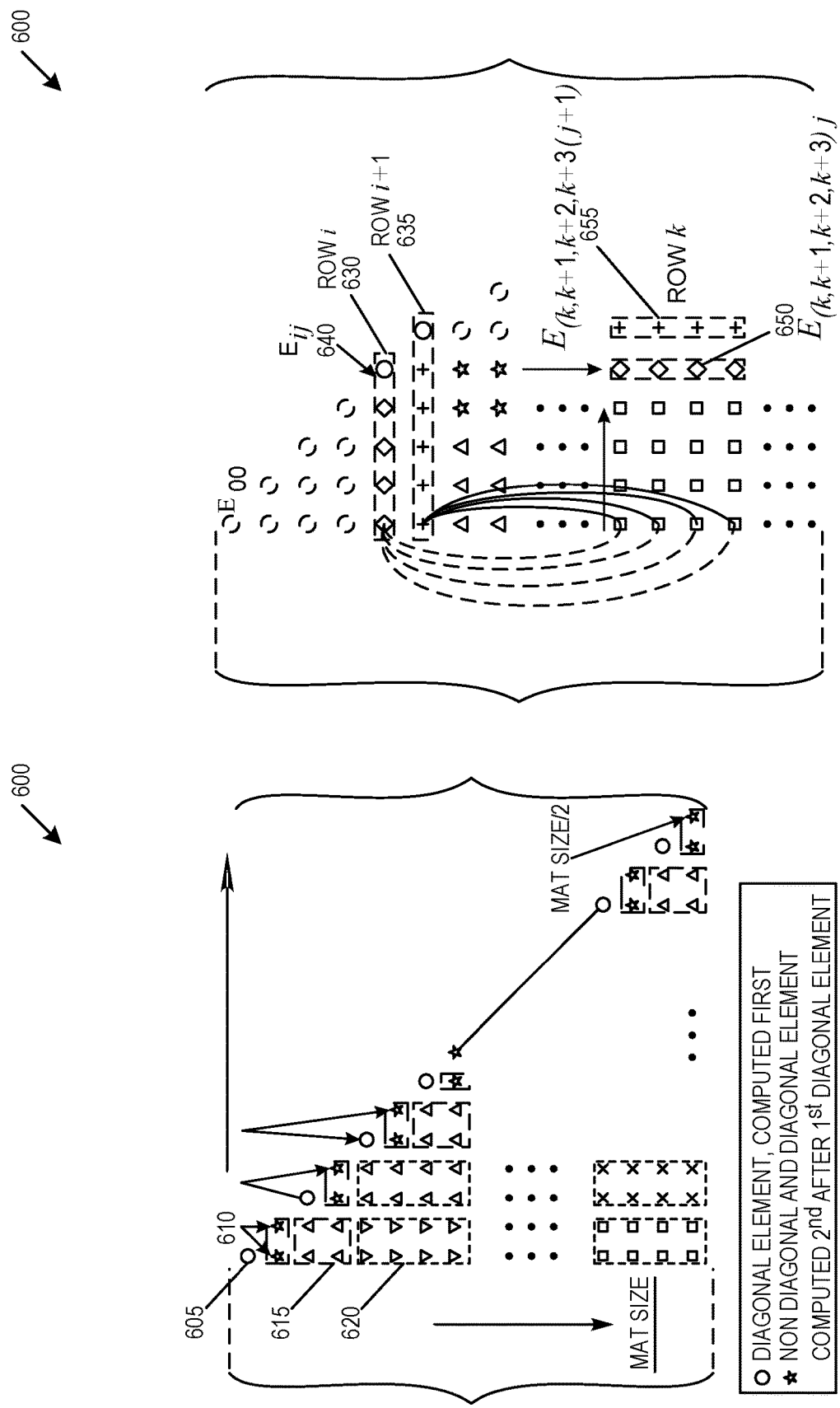
FIGS. 6A-6B are block diagrams illustrating dual-column matrix computations according to an embodiment.
Figure 7:
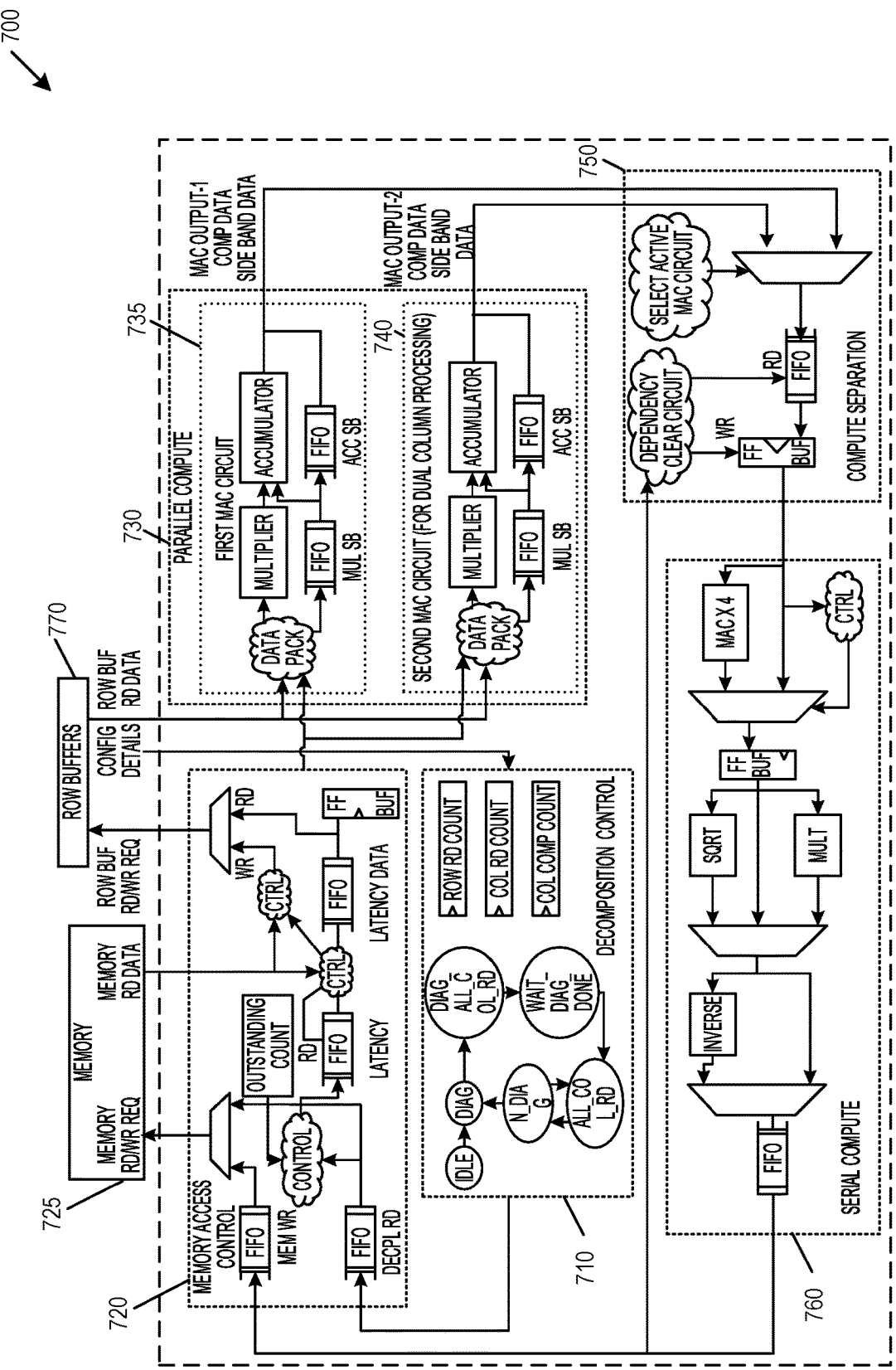
FIG. 7 is a block diagram of a matrix decomposition matrix decomposition circuit, in accordance with at least one embodiment.

FIGS. 6A-6B are block diagrams illustrating dual-column matrix computations 600 according to an embodiment. In particular, FIG. 6A shows dual-column computation order, whereas FIG. 6B shows row buffer based computation. Similar to single-column matrix computations 500, the execution order and matrix element grouping in dual-column matrix computations 600 is selected according to the memory data layout. For example, the grouping of elements within a column during dual-column matrix computations 600 is same as the grouping of elements within a column during single-column matrix computations 500. Unlike single-column matrix computations 500, two rows of data (e.g., corresponding to two diagonal elements) are buffered during dual-column matrix computations 600. This buffering is performed during computation of a diagonal element, to reduce memory reads further.

As shown in FIG. 6A, a first diagonal element 605 in a column is computed first followed by a pairing 610 of a subsequent element of that column and the next diagonal element. A shortened dual-column 615 includes two elements of the first column grouped with two elements of next column, and all four elements are computed in parallel. For subsequent operations, a standard dual-column 620 groups four elements of a column with four elements of the next column, and all eight elements are computed in parallel.

The pattern operations followed for dot product computation is shown in FIG. 6B. Two rows corresponding to diagonal elements, such as row i 630 and row i+1 635, are locally buffered while computing diagonal element $E_{ij}$, thus reducing memory reads. These two buffered rows are then multiplied with each set of input data during column element compute. As shown in FIG. 6B, input data is being multiplied with row i 630 for computation of elements E(k,k+1, k+2,k+3) j 650, and also multiplied with row i+1 635 for computation of elements E(k,k+1,k+2,k+3) j+1 655.

The dual-column matrix computations 600 provides substantial improvements in performance, and reduces the number of memory accesses by almost half. As shown in FIG. 6B, a single input read data is multiplied with two different row buffers 630 and 635 to calculate multiple column elements. This dual-column matrix computations 600 also provides the ability for a controller to fetch data only once for both columns. In an example, when compared to approximately 98,000 memory reads for decomposition of a 128×128 matrix in single column mode, dual-column matrix computations 600 require only approximately 53,000 memory reads.

Figure 8:
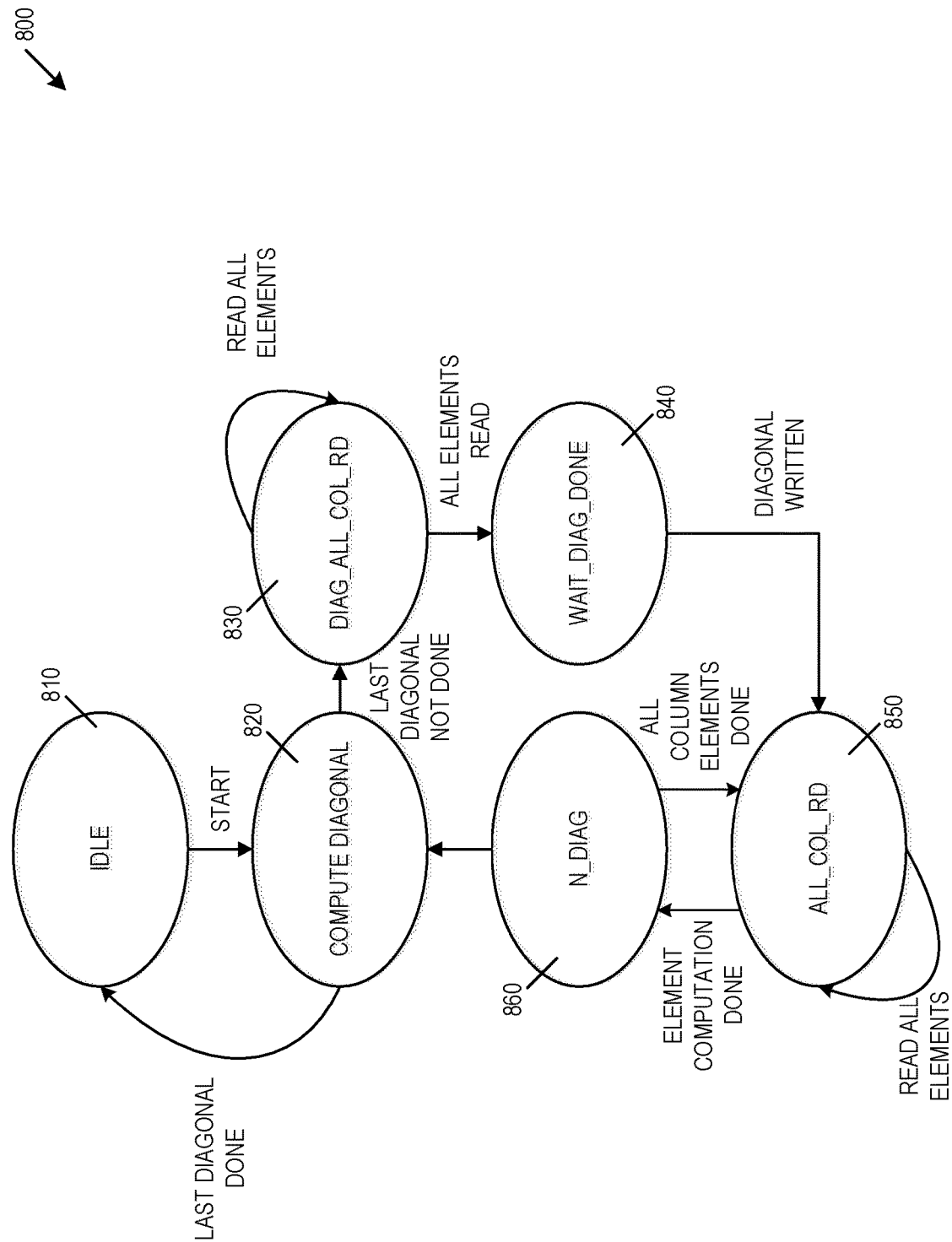
FIG. 8 is a block diagram of a matrix decomposition functional state machine, in accordance with at least one embodiment.

FIG. 7 is a block diagram of a hardware-accelerated matrix decomposition circuit 700, in accordance with at least one embodiment. Matrix decomposition circuit 700 includes a decomposition control circuit 710, a memory access control circuit 720, a parallel compute circuit 730, a computation separation circuit 750, and a serial compute circuit 760. The decomposition control circuit 710 controls the sequencing of memory fetch and compute operations, such as shown in and described with respect to FIGS. 5A-6B. An example of this sequencing controlled by the decomposition control circuit 710 is shown in FIG. 8 and described below.

The memory access control circuit 720 manages reading data from memory and writing data to memory 725 as directed by the decomposition control circuit 710. Memory 725 may include external memory, L2 cache memory, an internal buffer, a last level cache (LLC), or other memory. This memory access control circuit 720 handles address translation for triangular storage format or compressed linear storage format, and handles writing generated data based on various decomposition requirements. For example, for Takagi decomposition, memory access control circuit 720 may write generated diagonal-only data. In an example, the address translation provided by memory access control circuit 720 may be used to reduce a memory requirement to just over half of the original size, such as shown in and described with respect to FIGS. 4A-4B.

The parallel compute circuit 730 provides matrix decomposition parallel computing operations. The parallel compute circuit 730 includes various multiply-and-accumulate circuits, such as first MAC instruction circuit 735 and second MAC instruction circuit 740. The parallel compute circuit 730 performs per-column multiply-and-accumulate operations in parallel on multiple elements. In an example, the first MAC instruction circuit 735 is used during single-column processing, and both the first MAC instruction circuit 735 and the second MAC instruction circuit 740 together provide dual-column processing. In an example, processing of additional columns may be provided by a third MAC instruction circuit, a fourth MAC instruction circuit, or additional MAC instruction circuits. The parallel compute circuit 730 also provides element biasing, which further improves dependency management.

The computation separation circuit 750 manages dependency clear circuit and active MAC selection circuit. This is used to separate parallel operations from serial operations, which provides improved performance scaling (e.g., near-linear performance scaling) with multiple-column operations. The computation separation circuit 750 receives MAC output (e.g., partial computed data) from the parallel compute circuit 730 and waits for serial computation of previous-column data. When previous-column data is received, the computation separation circuit 750 merges the previous-column data with the MAC output and provides the merged output to the serial compute circuit 760. This allows MAC circuits within the parallel compute circuit 730 to begin parallel operations on a subsequent set of data.

The serial compute circuit 760 provides serial computation operations. In particular, the serial compute circuit 760 performs MAC operations for dependent elements, which may be followed division operations or square root operations as required. This serial compute circuit 760 also handles writing of the inverse of the diagonal element.

The matrix decomposition circuit 700 may also include one or more row buffers 770. Each row buffer stores row data corresponding to a diagonal element of a column that is currently undergoing computing operations. The row buffers 770 provide data to the parallel compute circuit 730, and may receive data from the memory circuit 725 through the memory access control circuit 720. By using row buffers 770 to receive and store data, the input data may be fetched only once from the memory circuit 725, which reduces latency and power requirements associated with memory fetch operations. Additionally, ability to fetch memory once provides the ability to write output data in-place back to the same memory addresses, thereby reducing the hardware area used for memory read and write operations. In addition, the row buffers 770 may be shared with any other compute circuit within matrix decomposition circuit 700 or outside matrix decomposition circuit 700, further reducing the hardware area used for memory read and write operations.

The matrix decomposition circuit 700 provides the ability to write diagonal elements as an inverse of each element value, or to write without inverse. This provides additional flexibility during matrix decomposition to avoid computationally intensive inverse operations, which may further reduce gate accesses and reduce latency. Matrix decomposition circuit 700 provides the ability to use in-place memory replacement of elements of the decomposed matrix. This in-place replacement further reduces system memory footprint. If needed, a separate memory space may also be used to store the decomposed matrix elements. The matrix decomposition circuit 700 provides the ability to start computing from any element of matrix, provided dependent elements are populated in memory. This provides additional flexibility during computations, such as providing the ability to save and restore various matrix calculation states. Matrix decomposition circuit 700 also provides the ability to operate on either upper-triangular or lower-triangular matrices, and provides the ability to operate on matrices stored in row-major or column-major format.

FIG. 8 is a block diagram of a matrix decomposition functional state machine 800, in accordance with at least one embodiment. The functional state machine 800 shows various states of the execution flow for the matrix decomposition provided by matrix decomposition circuit 700. The state transitions within the functional state machine 800 may be controlled by matrix decomposition circuit 700, such as shown in the decomposition control circuit 710.

The functional state machine 800 begins by transitioning from an idle state 810 to a compute diagonal state 820. When the decomposition control circuit 710 determines that the last diagonal has not been completed, the state machine 800 transitions to a read all column state 830. When all columns have been read, the state machine 800 transitions to a wait diagonal done state 840. When the diagonal has been written to memory, the state machine 800 transitions to a read all column elements state 850. All column elements are read, and column-specific computations are performed on all of the column elements. Once the column-specific computations are completed, the state machine 800 transitions to a next diagonal state 860, which increments the diagonal being computed and transitions back to the compute diagonal state 820. The processing loop within the state machine 800 may repeat for additional diagonals, or may transition back to the idle state 810 when the last diagonal has been completed.

Figure 9:
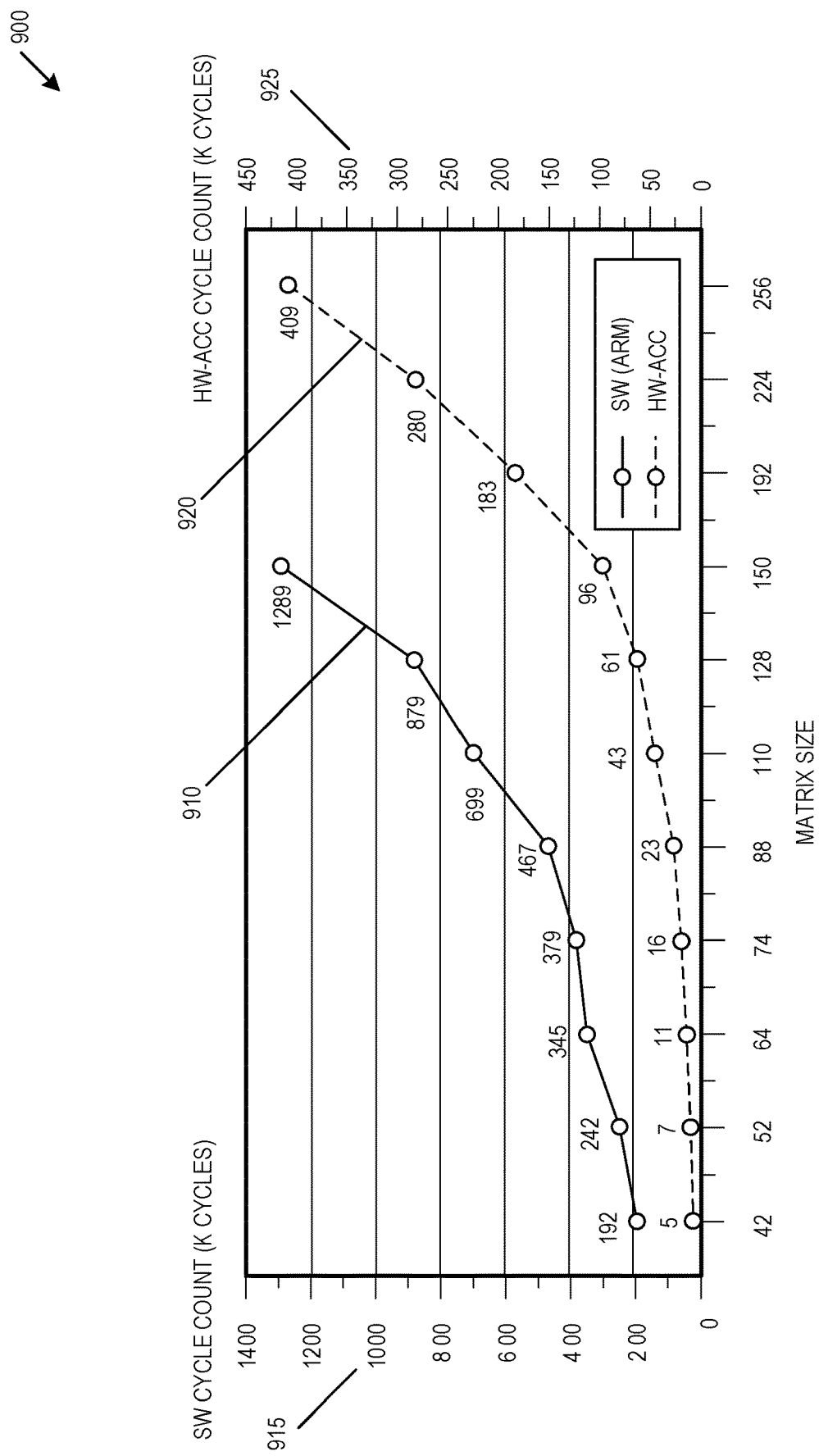
FIG. 9 is a cycle count reduction graph, in accordance with at least one embodiment.

FIG. 9 is a cycle count reduction graph 900, in accordance with at least one embodiment. Graph 900 includes a first set of data points 910 corresponding to a first scale 915 showing the cycle count for a matrix decomposition executed on a generic processor, such as on an ARM Cortex A9 running at 1.2 GHz. Graph 900 includes a second set of data points 920 corresponding to a second scale 925 showing the cycle count for a matrix decomposition executed using the hardware accelerated matrix decomposition circuit. The matrix decomposition circuit provides a substantial reduction in the cycle count. For example, for a 128×128 matrix, the cycle count is reduced from approximately 879,000 cycles to approximately 61,000 cycles. A comparison of the cycle count for a 128×128 matrix is shown in Table 1 below:

TABLE 1

| Cycle Count for 128 × 128 Matrix | |
|---|---|
| Platform | Number Of Cycles |
| Intel-Atom (CHT, 1.4 GHz) | 502K |
| ARM-Cortex-A9 (1.2 GHz) | 879K |
| Proposed single column solution | 121K |
| Proposed Dual column solution | 61K |

The matrix decomposition circuit requires very low power to operate. In an example, matrix decomposition of 128×128 matrix using the matrix decomposition circuit uses 47.55 mW at 600 MHz with TSMC 28 nm, nom, 1V, 25C, with 79.25 pF. The matrix decomposition circuit also requires a small footprint. In an example, the matrix decomposition circuit may be implemented on 0.098 mm$^2$ for logic and 0.013 mm$^2$ RAM (e.g., shared RAM) at 600 MHz with TSMC 28LP, Pslow, 0.99V, 30C.

The matrix decomposition circuit provides improved speed and scaling. In an example, the matrix decomposition circuit provides approximately 14× speed improvement compared to software implementation on a generic processor. In another example, this matrix decomposition circuit scales approximately linearly, such as requiring approximately 61K cycles for dual-column operations compared to approximately 121K cycles for single-column operations.

The matrix decomposition circuit also provides substantial reduction in memory accesses. In an example, a generic processor executing a Cholesky decomposition for a 128×128 matrix size uses approximately 140K loads and approximately 75K stores with 64-byte accesses, whereas the matrix decomposition circuit reduces this to approximately 53K loads and approximately 2.2K stores with only 16-byte accesses. This results in a reduction of approximately 15× in memory access bandwidth.

Figure 10:
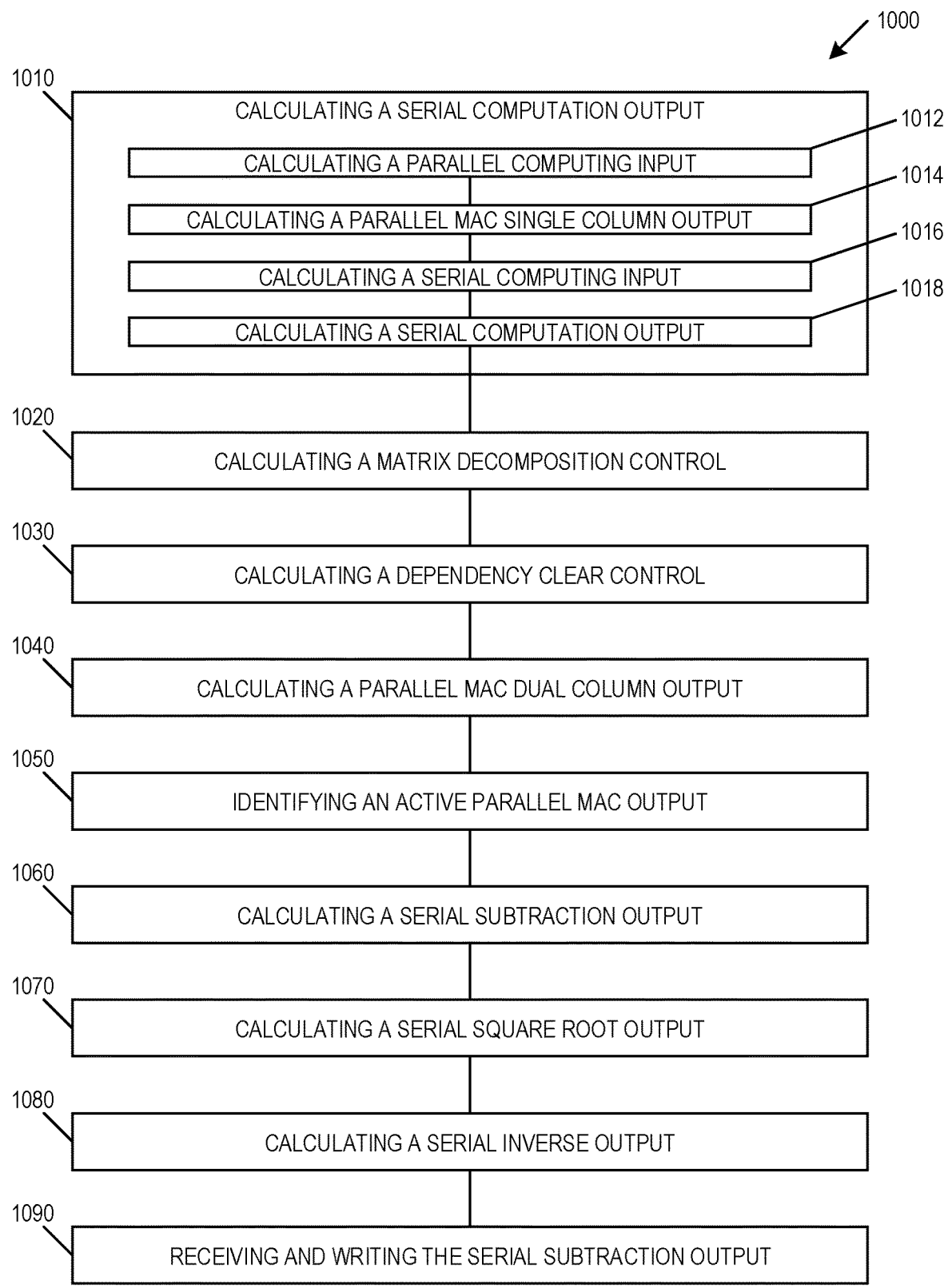
FIG. 10 is a block diagram of a matrix decomposition method, in accordance with at least one embodiment.

FIG. 10 is a block diagram of a matrix decomposition method 1000, in accordance with at least one embodiment. Method 1000 may include calculating a serial computation output 1010. Calculating a serial computation output 1010 may include calculating a parallel computing input 1012 at a memory access control circuit, calculating a parallel MAC single column output 1014 at a first multiply and accumulate (MAC) circuit within a parallel compute circuit, the parallel MAC single column output calculated based on the parallel computing input and a first column input, calculating a serial computing input 1016 at a computation separation circuit based on the parallel MAC single column output, and calculating a serial computation output 1018 at a serial compute circuit based on the serial computing input.

Method 1000 may include calculating a matrix decomposition control 1020 at a decomposition control circuit. In an example, calculating the parallel computing input 1012 at the memory access control circuit is based on the matrix decomposition control. In an example, the matrix decomposition control is calculated based on the matrix decomposition configuration input. Method 1000 may include calculating a dependency clear control 1030 at the computation separation circuit based on the parallel MAC single column output. In an example, calculating the serial computing input 1016 is further based on the dependency clear control. Method 1000 may include calculating a parallel MAC dual column output 1040 at a second MAC circuit based on the second column input. Method 1000 may include identifying an active parallel MAC output 1050 at the computation separation circuit based on the parallel MAC single column output and the parallel MAC dual column output. In an example, the computation separation circuit calculating the serial computing input 1016 is further based on the active parallel MAC output and the parallel MAC dual column output.

Method 1000 may include calculating a serial subtraction output 1060 at a serial subtraction circuit within the serial compute circuit based on the serial computing input. In an example, the serial compute circuit calculating the serial computation output is based on the serial subtraction output. Method 1000 may include calculating a serial square root output 1070 at a square root circuit within the serial compute circuit based on the serial subtraction output. In an example, the serial compute circuit calculating the serial computation output is further based on the serial square root output. Method 1000 may include calculating a serial inverse output 1080 at an inverse circuit within the serial compute circuit based on the serial subtraction output. In an example, the serial compute circuit calculating the serial computation output is further based on the serial inverse output. Method 1000 may include receiving the serial subtraction output 1090 at the memory access control circuit and writing the serial subtraction output to a memory.

Figure 11:
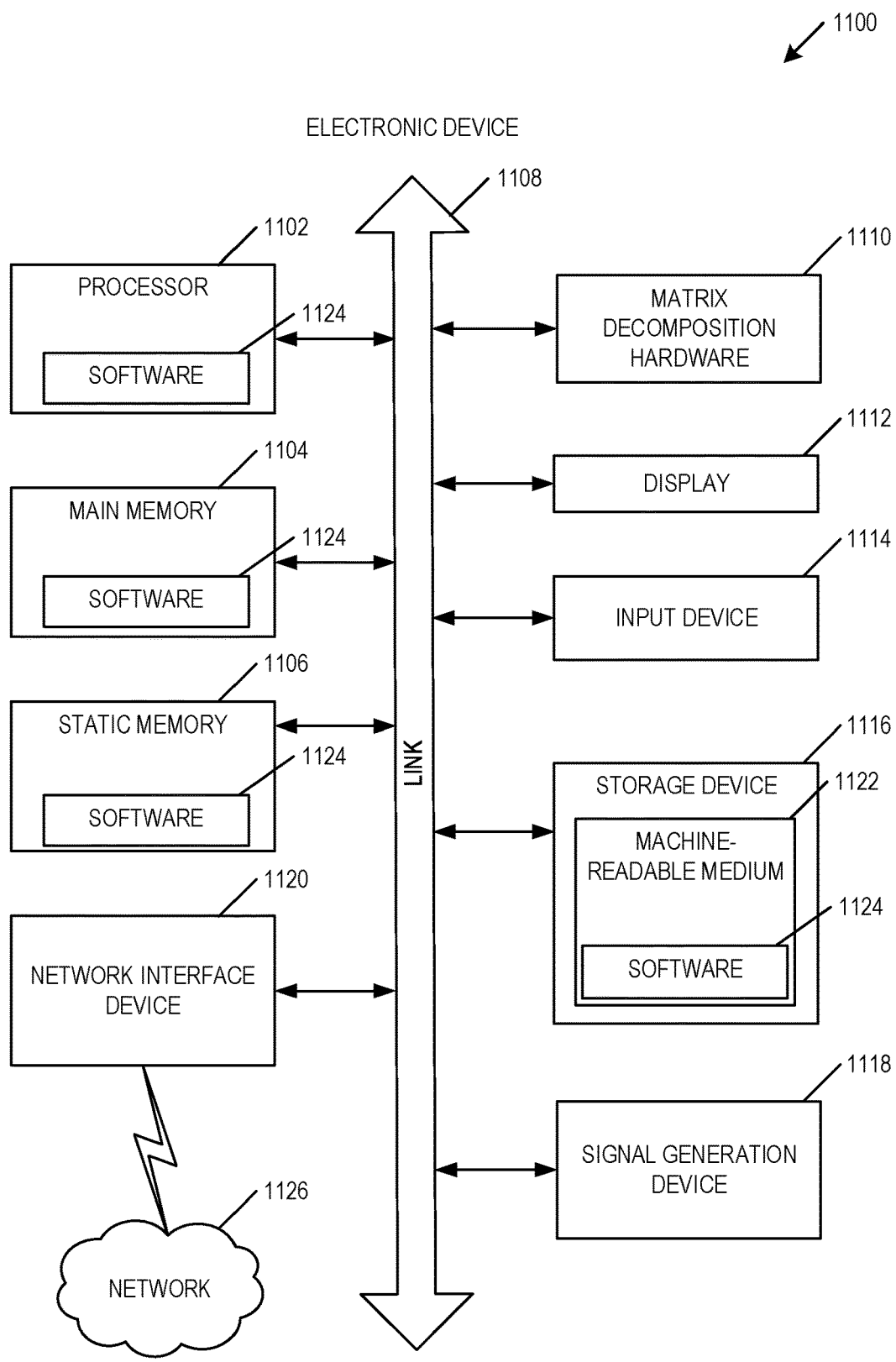
FIG. 11 is a block diagram illustrating a matrix decomposition matrix decomposition circuit implemented in the example form of an electronic device, within which a set or sequence of instructions may be executed to cause the machine to perform any one of the methodologies discussed herein, according to an example embodiment.

FIG. 11 is a block diagram illustrating a matrix decomposition matrix decomposition circuit implemented in the example form of an electronic device 1100, within which a set or sequence of instructions may be executed to cause the machine to perform any one of the methodologies discussed herein, according to an example embodiment. Electronic device 1100 may also represent the devices shown in FIG. 7. In alternative embodiments, the electronic device 1100 operates as a standalone device or may be connected (e.g., networked) to other machines. In a networked deployment, the electronic device 1100 may operate in the capacity of either a server or a client machine in server-client network environments, or it may act as a peer machine in peer-to-peer (or distributed) network environments. The electronic device 1100 may be an integrated circuit (IC), a portable electronic device, a personal computer (PC), a tablet PC, a hybrid tablet, a personal digital assistant (PDA), a mobile telephone, or any electronic device 1100 capable of executing instructions (sequential or otherwise) that specify actions to be taken by that machine to detect a user input. Further, while only a single electronic device 1100 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus).

The electronic device 1100 includes matrix decomposition hardware 1110, where the matrix decomposition hardware 1110 may include the components described above in FIG. 7. The electronic device 1100 may further include a display unit 1112, where the display unit 1112 may include a single component that provides a user-readable display and a protective layer, or another display type. The electronic device 1100 may further include an input device 1114, such as a pushbutton, a keyboard, an NFC card reader, or a user interface (UI) navigation device (e.g., a touch-sensitive input). The electronic device 1100 may additionally include a storage device 1116, such as a solid-state drive (SSD) unit. The electronic device 1100 may additionally include a signal generation device 1118 to provide audible or visual feedback, such as a speaker to provide an audible feedback or one or more LEDs to provide a visual feedback. The electronic device 1100 may additionally include a network interface device 1120, and one or more additional sensors (not shown), such as a global positioning system (GPS) sensor, compass, accelerometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the electronic device 1100. The main memory 1104, static memory 1106, and the processor 1102 may also constitute machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

The figures below detail example architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
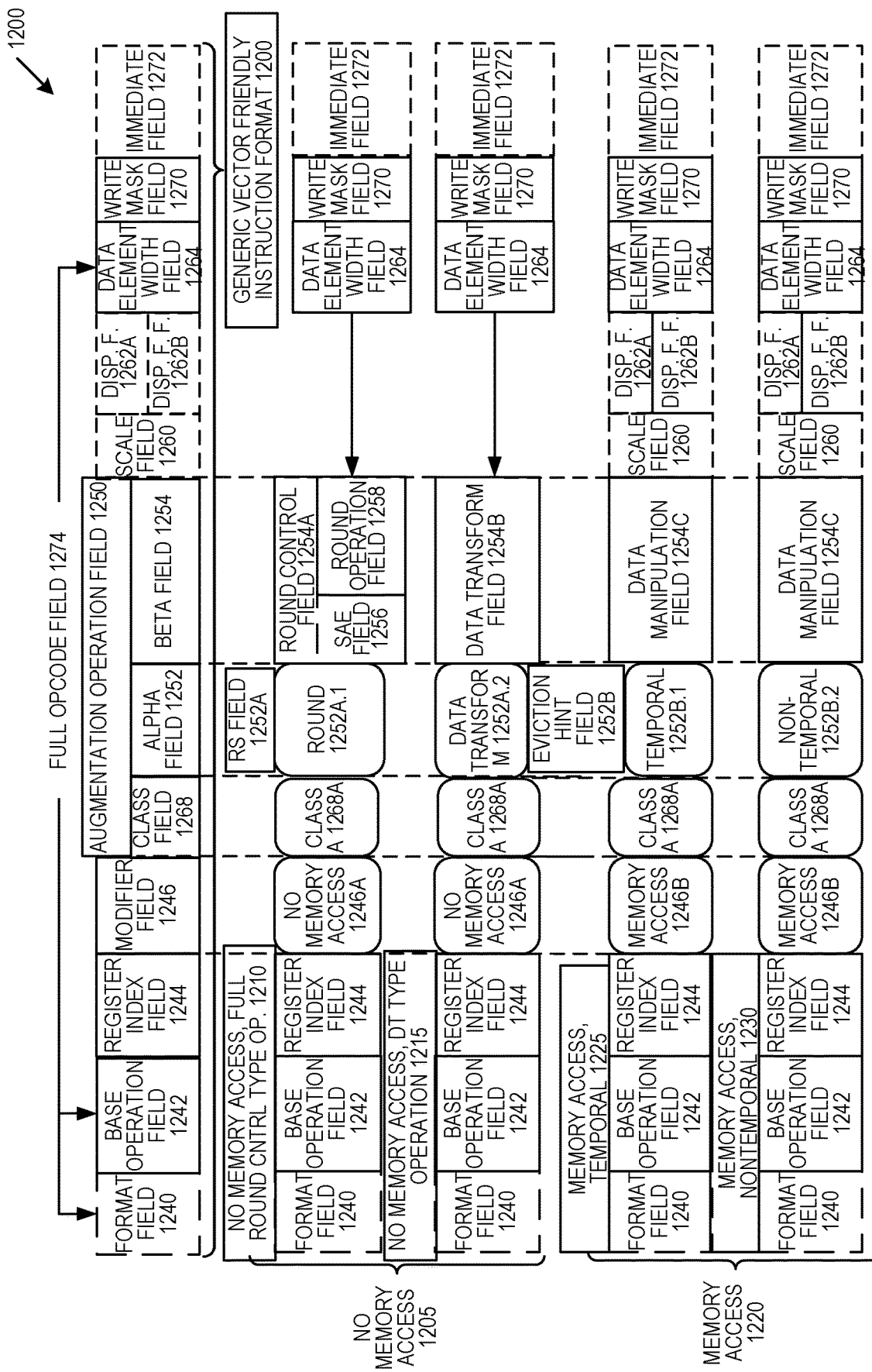
FIGS. 12A-12B are block diagrams illustrating a generic vector friendly instruction format and instruction templates thereof according to an embodiment.
Figure 12B:
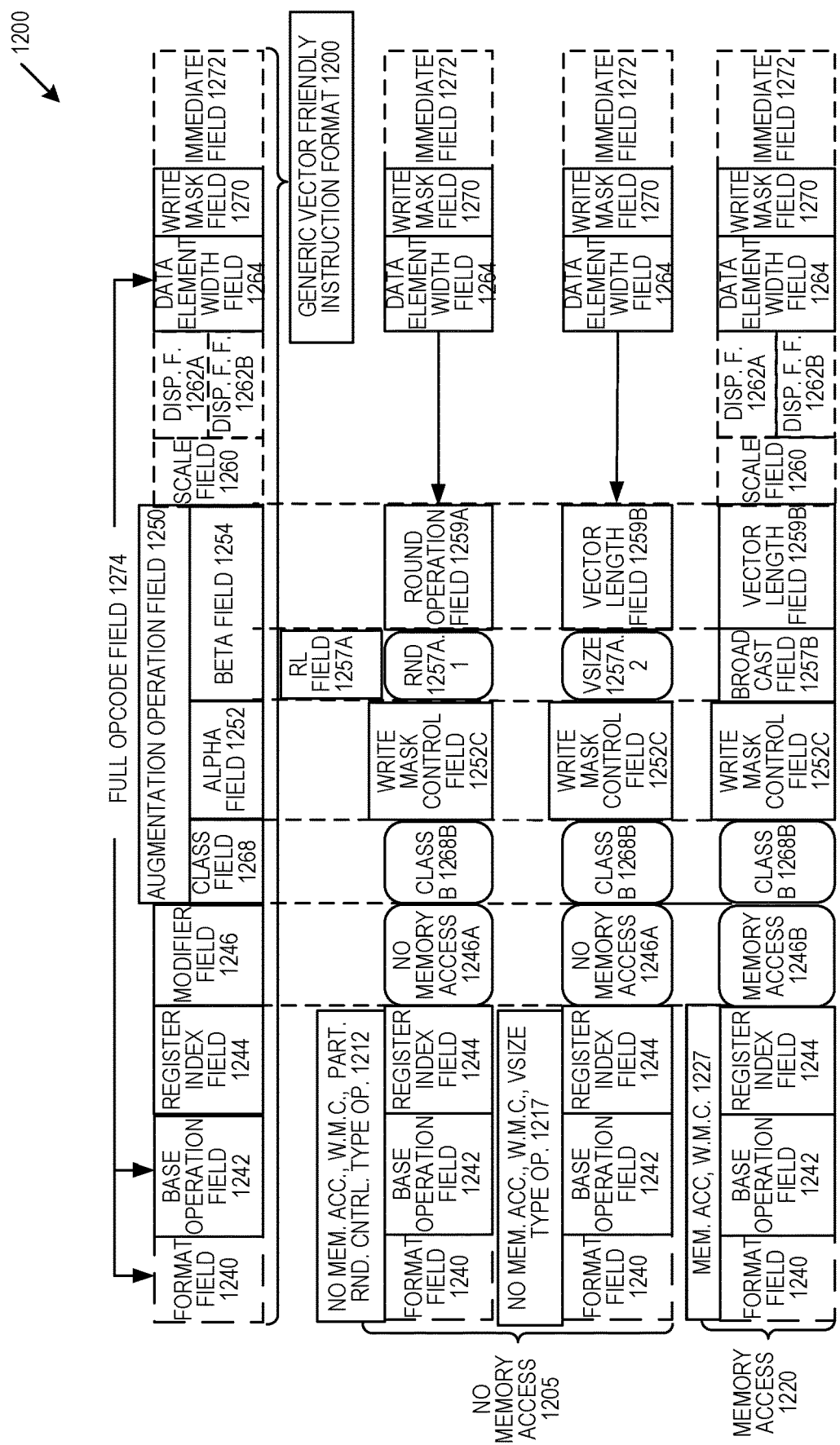

FIGS. 12A-12B are block diagrams illustrating a generic vector friendly instruction format and instruction templates thereof according to an embodiment. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to an embodiment. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, VSIZE type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a PxQ (e.g. 32x512, 16x128, 32x1024, 64x1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*index+base$).

Displacement Field 1262A—its content is used as part of memory address generation (e.g., for address generation that uses $2^{scale}*index+base+displacement$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Example Specific Vector Friendly Instruction Format

FIG. 13 is a block diagram illustrating an example specific vector friendly instruction format according to an embodiment. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

Figure 13A:
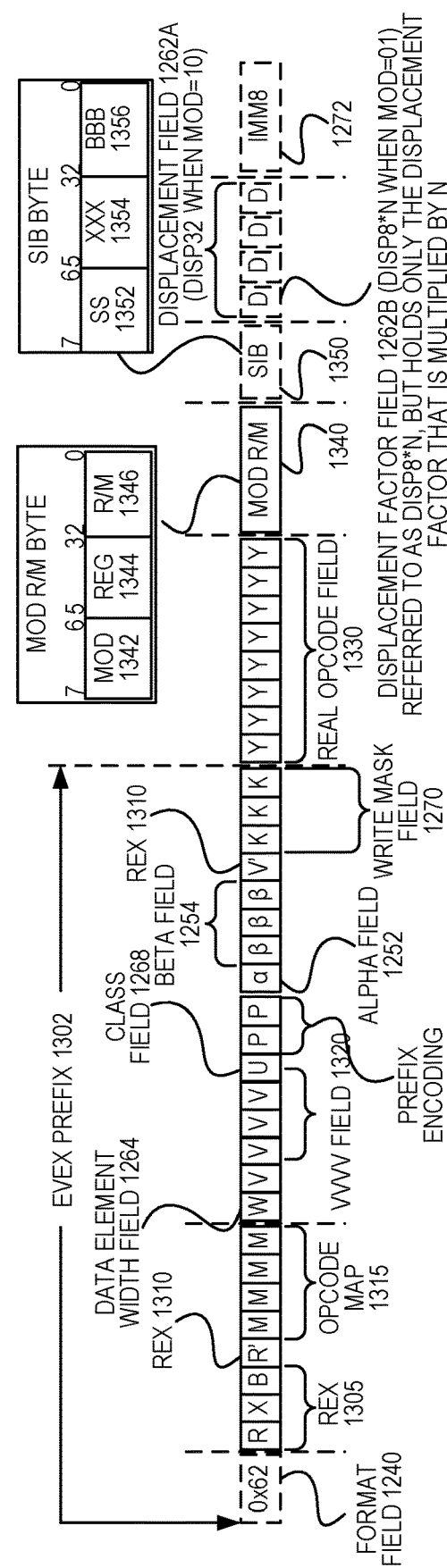
FIG. 13A-13D are block diagrams illustrating an example specific vector friendly instruction format according to an embodiment.

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1257BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1264 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA may execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 6 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 may be summarized to two situations: encoding either the destination register operand or a source register operand, or be treated as an opcode extension and not used to encode any instruction operand. The role of RIM field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it may only address between −128 and 127 bytes offsets; in terms of 64 byte cache lines, disp8 uses 8 bits that may be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp**8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272** operates as previously described.

Full Opcode Field

Figure 13B:
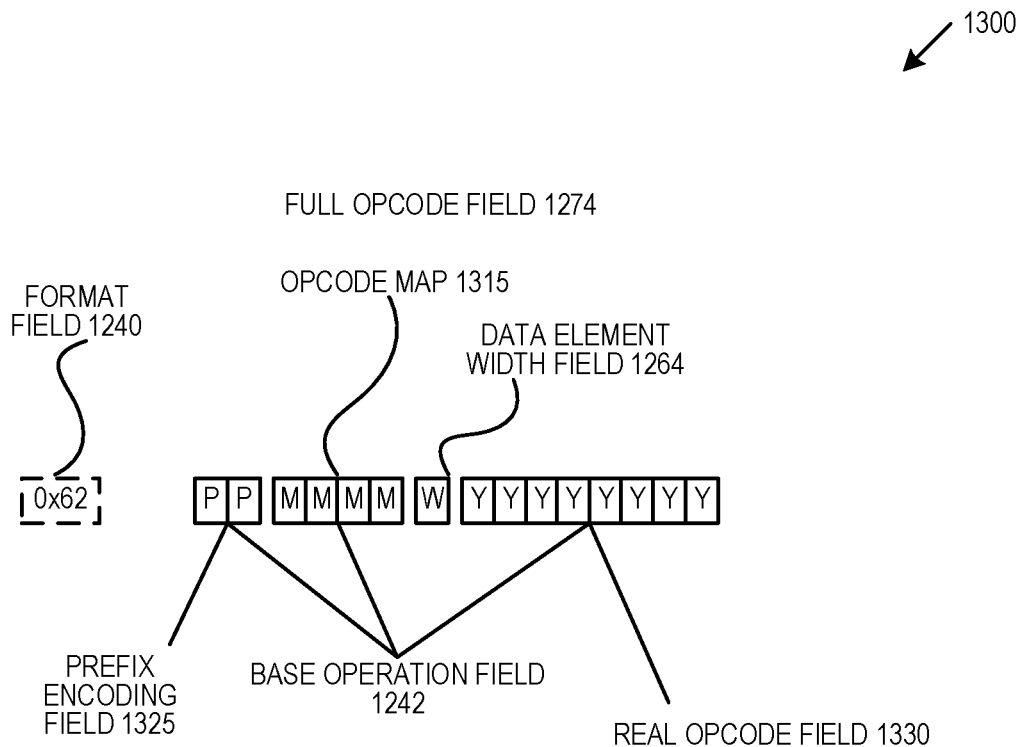

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

Figure 13C:
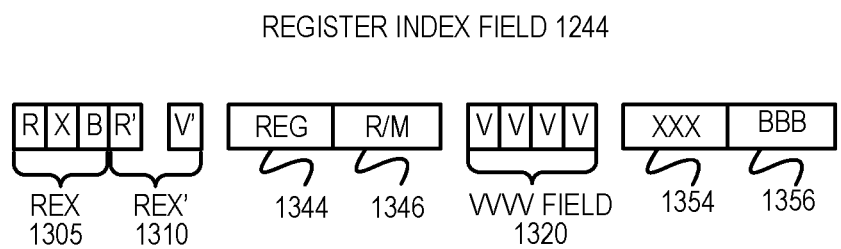

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
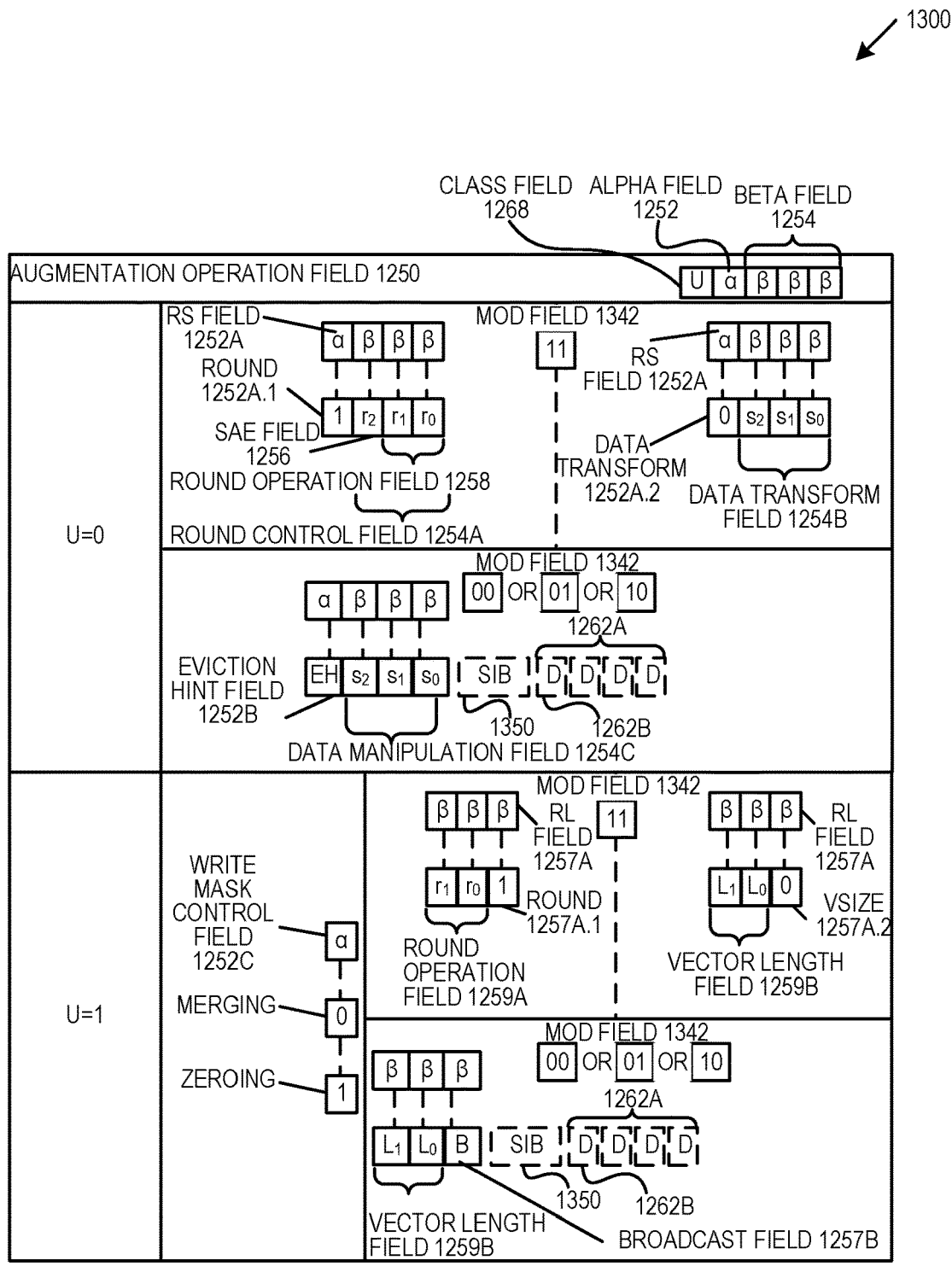

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]—EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]—EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]—EH) is interpreted as the write mask control (Z) field 1252C. When U=1 and the MOD field 1342 contains 11 (signifying a no memory access operation), part of the beta field 1254 (EVEX byte 3, bit [4]—S0) is interpreted as the RL field 1257A; when it contains a 1 (round 1257A.1) the rest of the beta field 1254 (EVEX byte 3, bit [6-5]—S2-1) is interpreted as the round operation field 1259A, while when the RL field 1257A contains a 0 (VSIZE 1257.A2) the rest of the beta field 1254 (EVEX byte 3, bit [6-5]—S2-1) is interpreted as the vector length field 1259B (EVEX byte 3, bit [6-5]—L1-0). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-L1-0) and the broadcast field 1257B (EVEX byte 3, bit [4]—B).

Example Register Architecture

Figure 14:
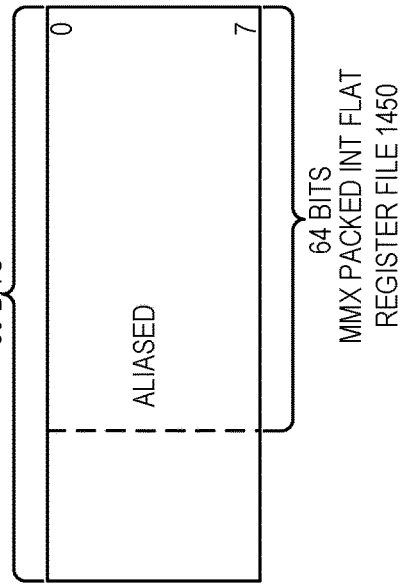
FIG. 14 is a block diagram of a register architecture according to one embodiment of the invention.
Figure 14:
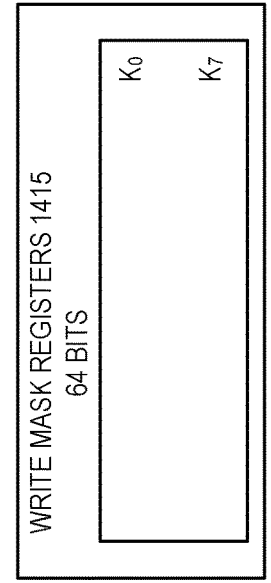
Figure 14:
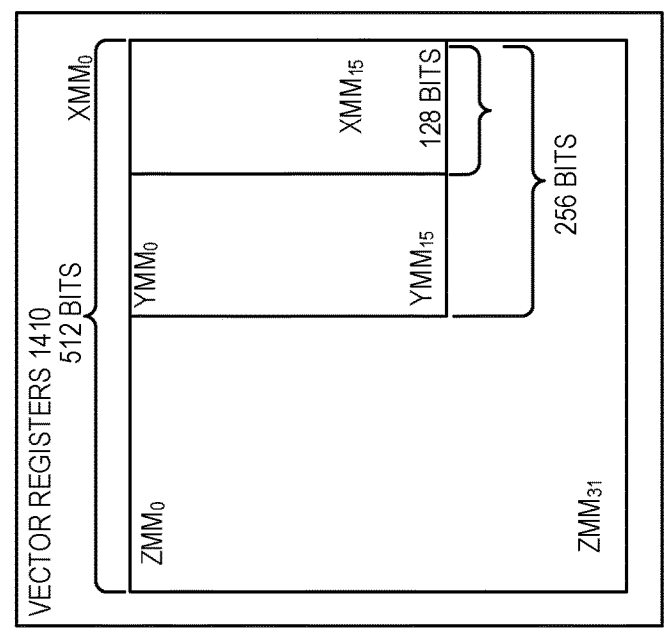

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
| --- | --- | --- | --- |
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures: In-order and Out-of-order Core Block Diagram

Figure 15A:
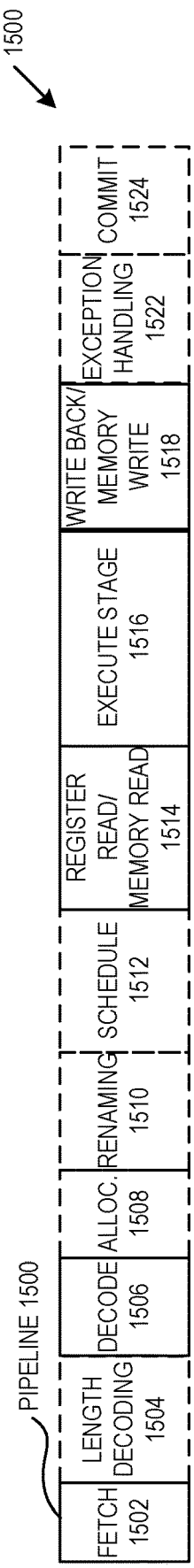
FIG. 15A is a block diagram illustrating both an example in-order pipeline and an example register renaming, out-of-order issue/execution pipeline according to an embodiment.
Figure 15B:
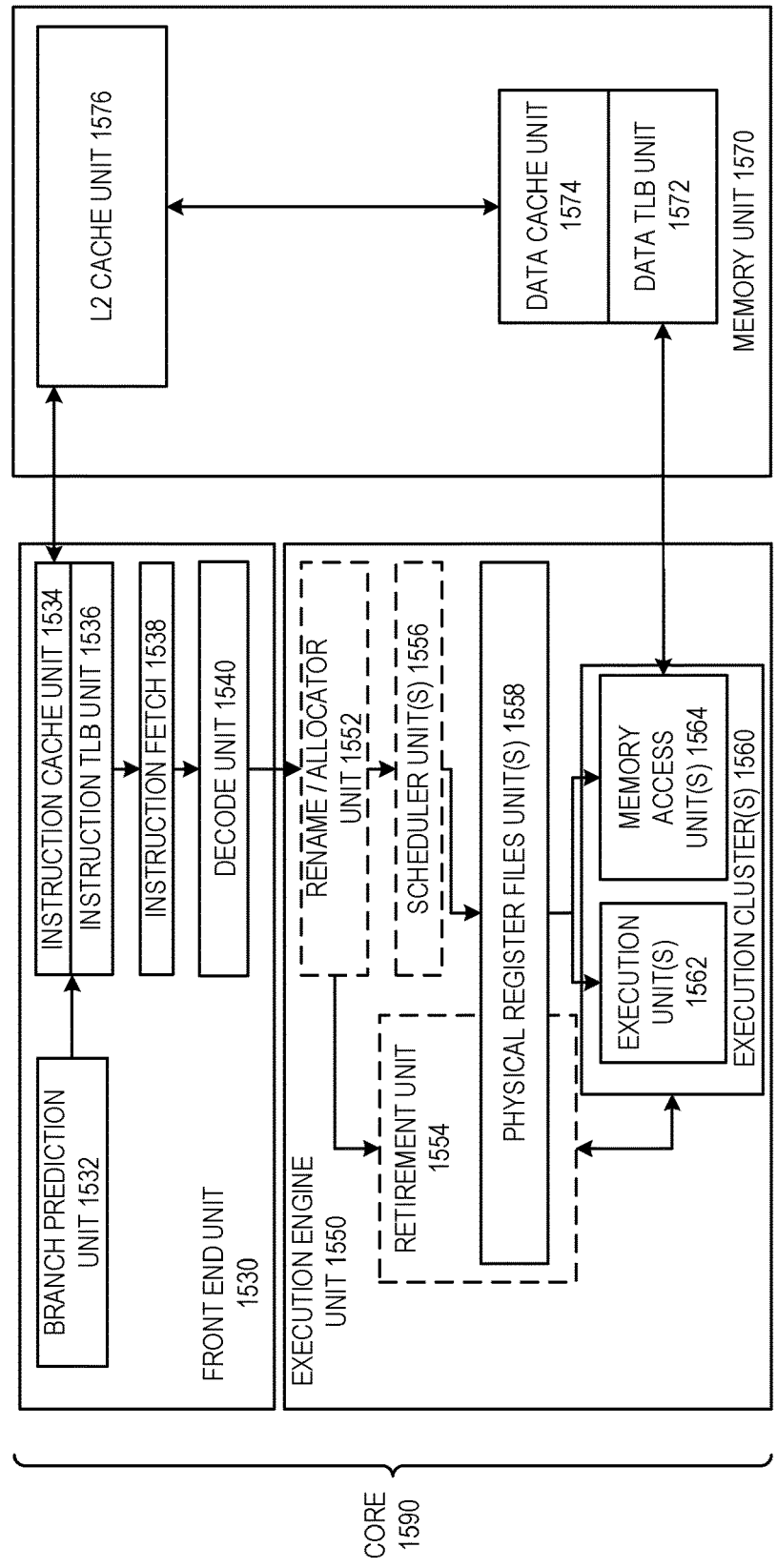
FIG. 15B is a block diagram illustrating both an example embodiment of an in-order architecture core and an example register renaming, out-of-order issue/execution architecture core to be included in a processor according to an embodiment.

FIG. 15A is a block diagram illustrating both an example in-order pipeline and an example register renaming, out-of-order issue/execution pipeline according to an embodiment. FIG. 15B is a block diagram illustrating both an example embodiment of an in-order architecture core and an example register renaming, out-of-order issue/execution architecture core to be included in a processor according to an embodiment. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one example embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the example register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Example In-Order Core Architecture

Figure 16B:
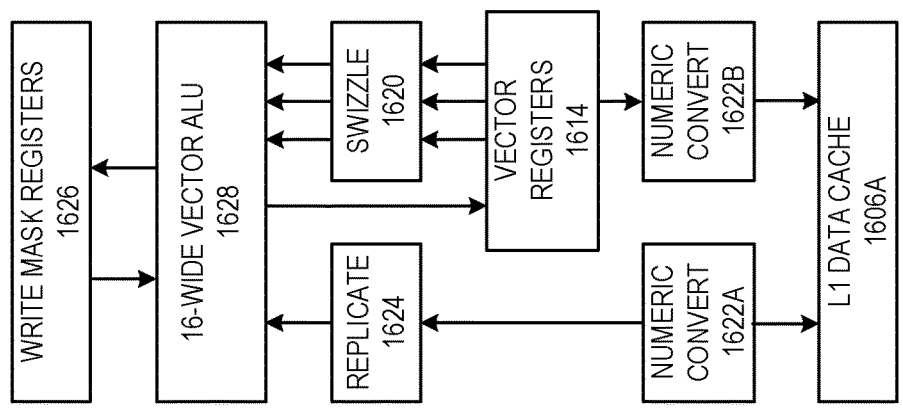
FIG. 16A-16B illustrate a block diagram of a more specific example in-order core architecture, which core would be one of several logic circuits (including other cores of the same type and/or different types) in a chip.
Figure 16A:
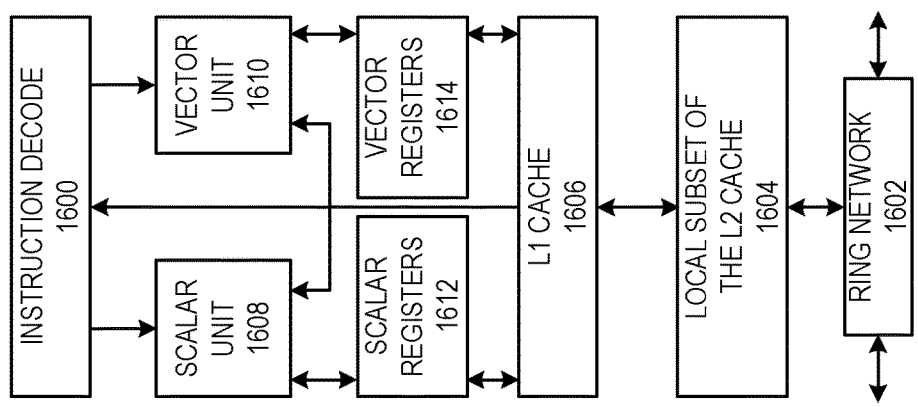

FIGS. 16A-16B illustrate a block diagram of a more specific example in-order core architecture, which core would be one of several logic circuits (including other cores of the same type and/or different types) in a chip. The logic circuits communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to an embodiment. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and may be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic circuits to communicate with each other within the chip. Each ring data-path is 1012-bits wide per direction.

FIG. 16B is an expanded view of part of the processor core in FIG. 16A according to an embodiment. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
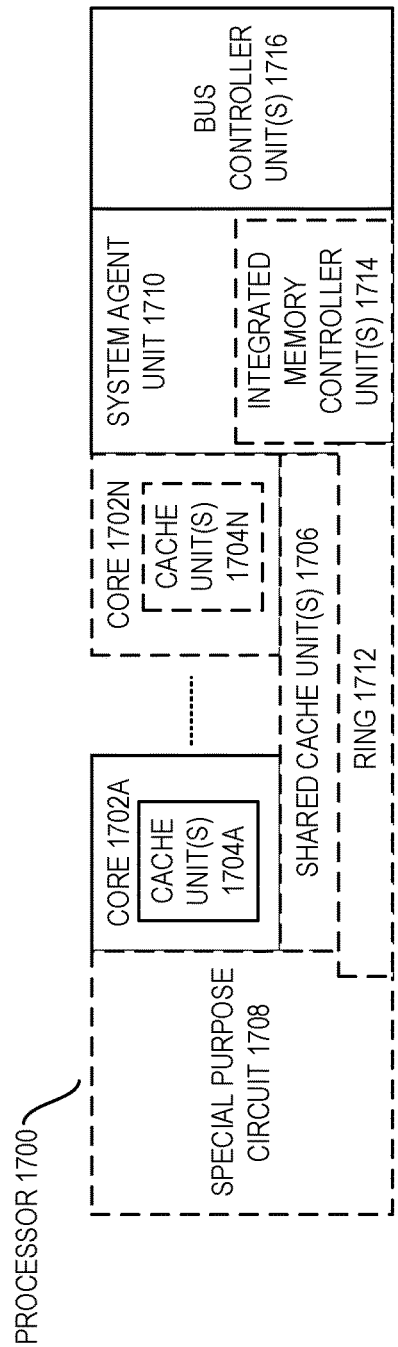
FIG. 17 is a block diagram of a processor that may have more than one core, may have an integrated memory controller, and may have integrated graphics according to an embodiment.

FIG. 17 is a block diagram of a processor 1700 that may have more than one core, may have an integrated memory controller, and may have integrated graphics according to an embodiment. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose circuit 1708.

Thus, different implementations of the processor 1700 may include: 1) a CPU with the special purpose circuit 1708 being integrated graphics and/or scientific (throughput) circuit (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics circuit 1708, the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include circuit and components needed for regulating the power state of the cores 1702A-N and the integrated graphics circuit 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Example Computer Architectures

FIGS. 18-21 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution circuit as disclosed herein are generally suitable.

Figure 18:
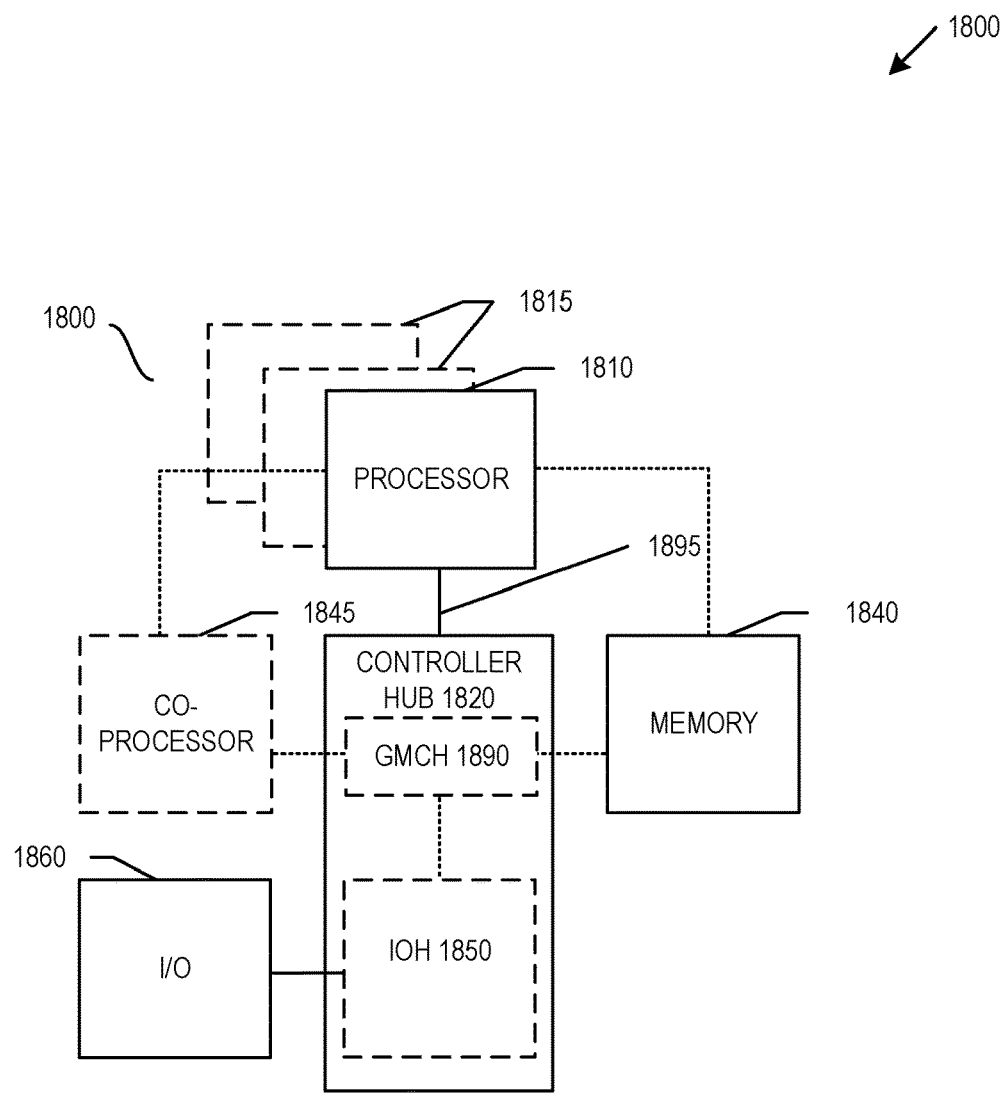
FIG. 18 is a block diagram of a system in accordance with one embodiment.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There may be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
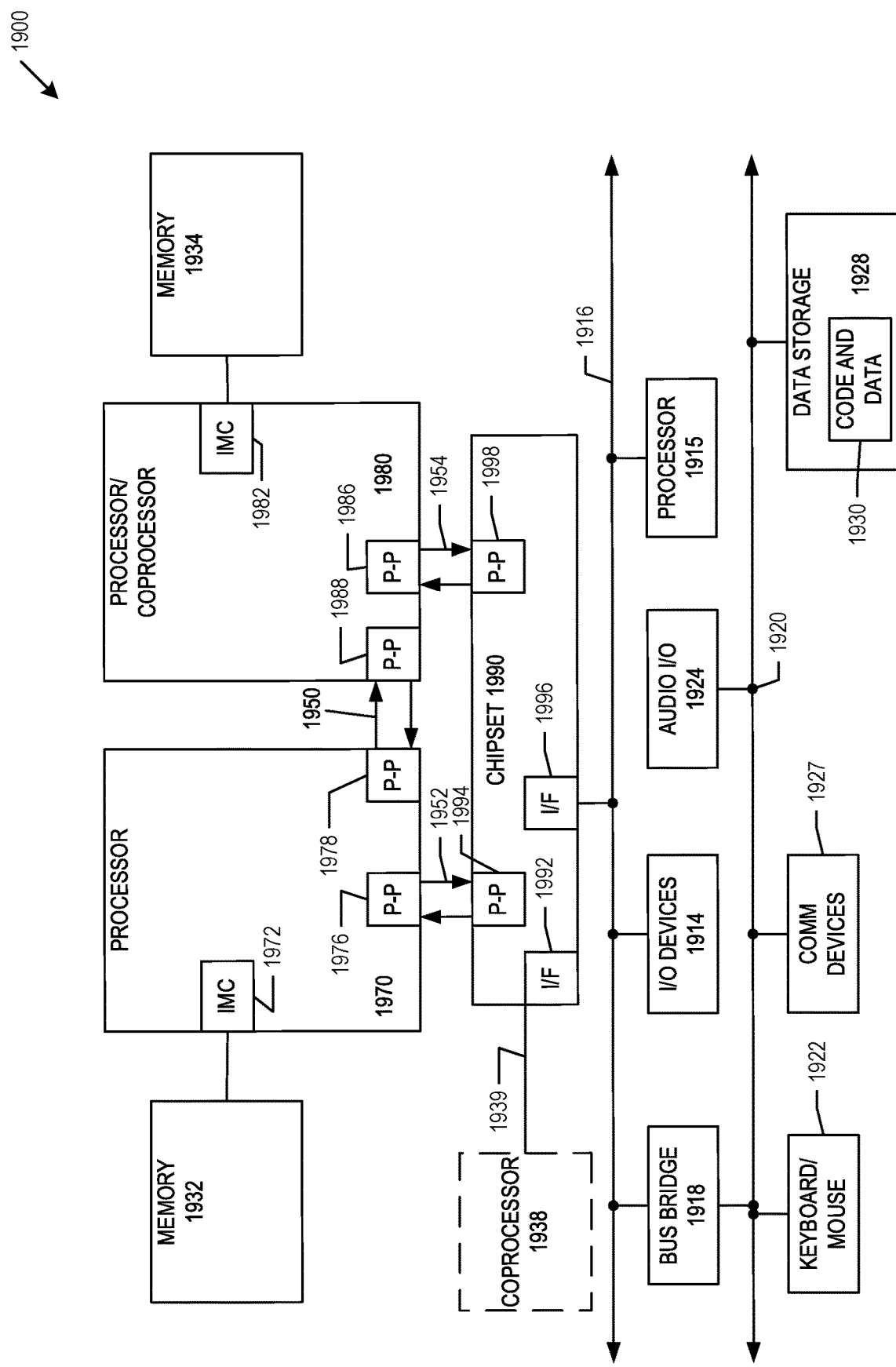
FIG. 19 is a block diagram of a first more specific example system in accordance with an embodiment.

Referring now to FIG. 19, shown is a block diagram of a first more specific example system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPG-PU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
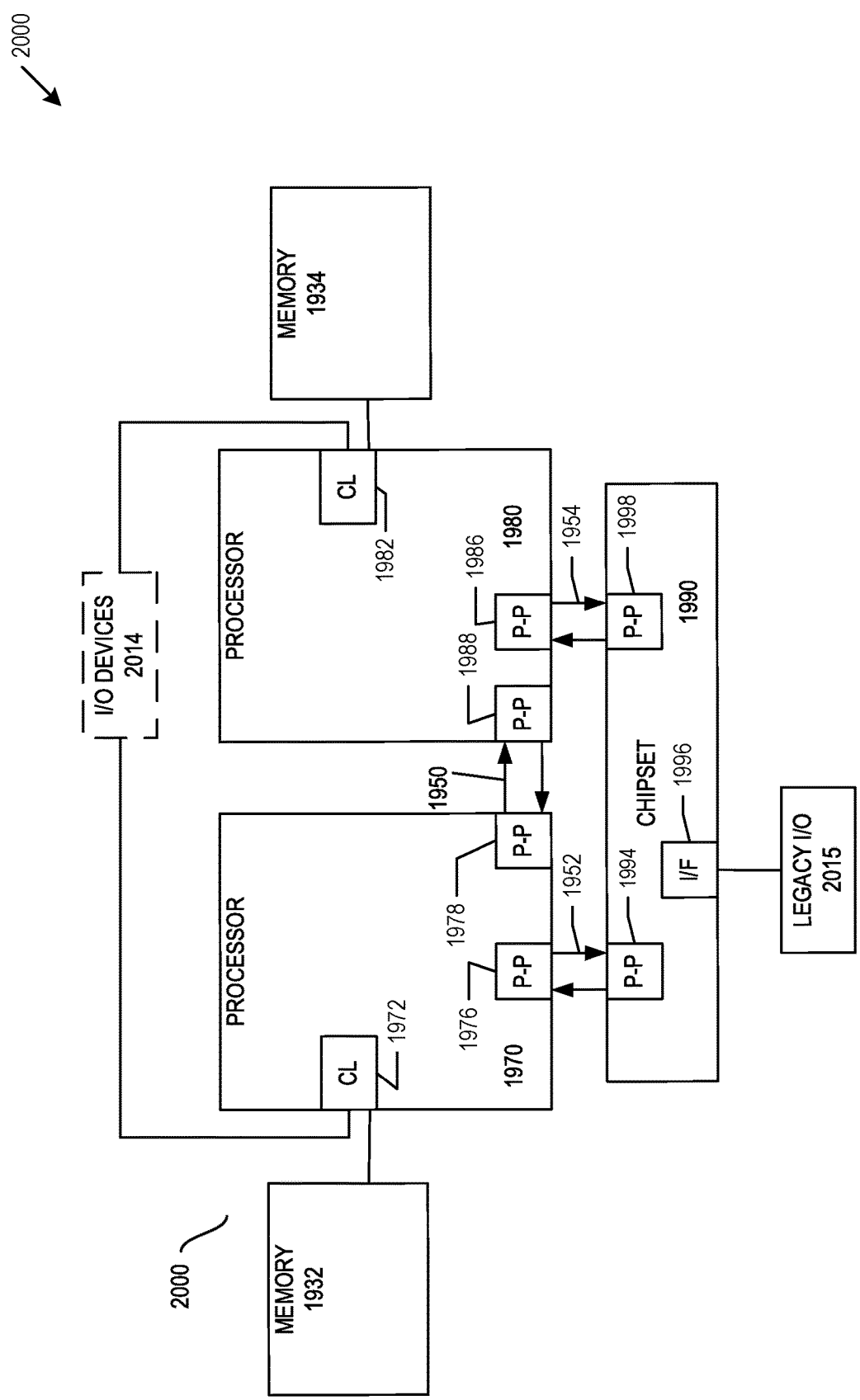
FIG. 20 is a block diagram of a second more specific example system in accordance with an embodiment.

Referring now to FIG. 20, shown is a block diagram of a second more specific example system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
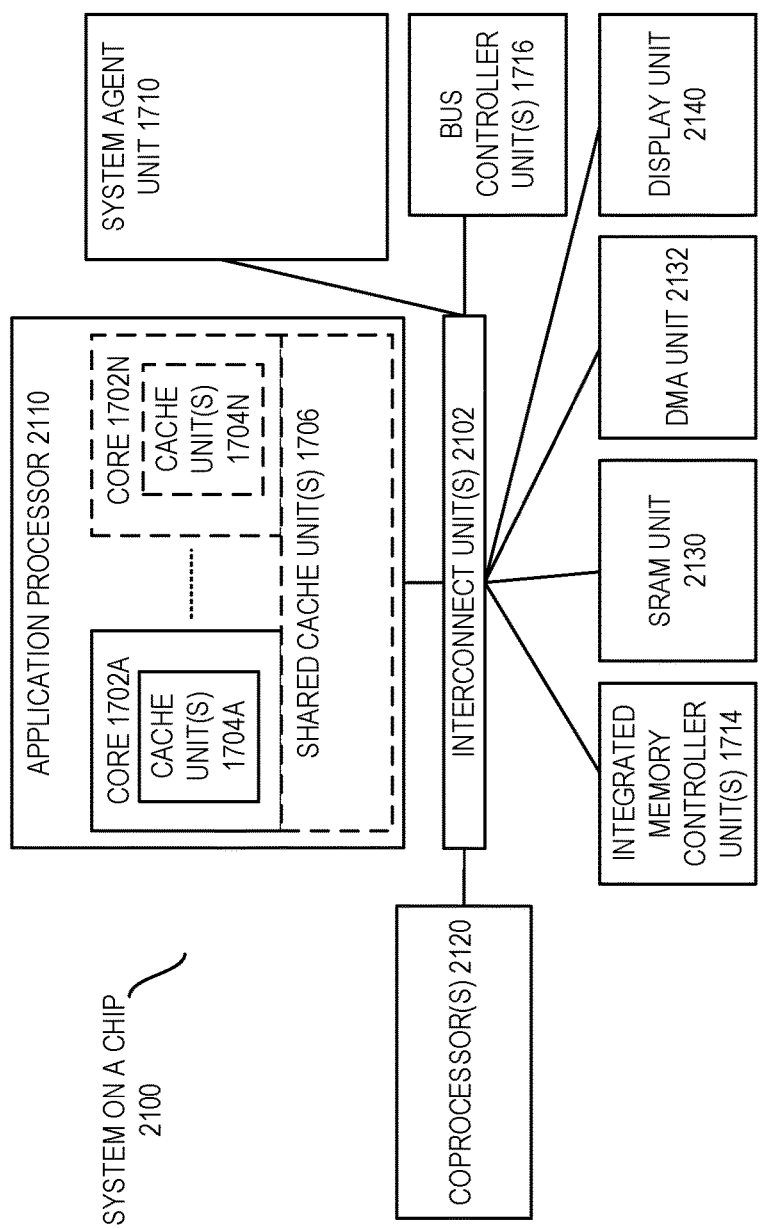
FIG. 21 is a block diagram of a SoC in accordance with an embodiment.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 202A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
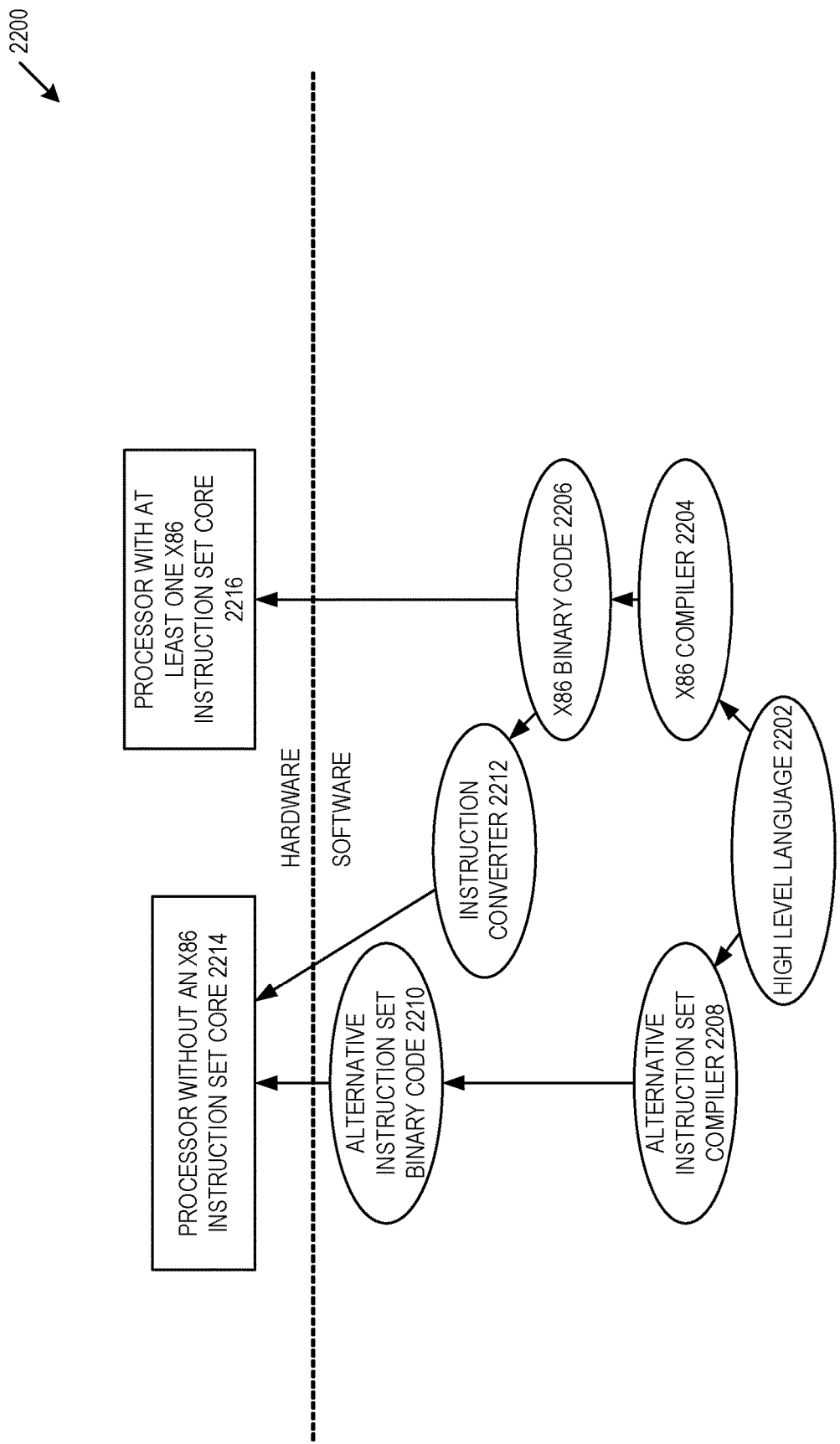
FIG. 22 is a block diagram contrasting the use of a software instruction converter to convert binary instructions in a source instruction set to binary instructions in a target instruction set according to an embodiment.

FIG. 22 is a block diagram contrasting the use of a software instruction converter to convert binary instructions in a source instruction set to binary instructions in a target instruction set according to an embodiment. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that may, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

To better illustrate the method and apparatuses disclosed herein, a non-limiting list of embodiments is provided here.

Example 1 is a hardware accelerated system comprising: a parallel compute circuit including a first multiply and accumulate (MAC) circuit to obtain a parallel computing input and calculate a parallel MAC single column output based on the parallel computing input and the first column input; a computation separation circuit to provide a serial computing input to a serial compute circuit based on the parallel MAC single column output; and a serial compute circuit to obtain the serial computing input and calculate a serial computation output.

In Example 2, the subject matter of Example 1 optionally includes a memory access control circuit to provide the parallel computing input.

In Example 3, the subject matter of Example 2 optionally includes wherein: the first column input is received at the memory access control circuit from a memory circuit; and the first column output is stored in a first row buffer.

In Example 4, the subject matter of Example 3 optionally includes wherein the serial computation output is stored in-place in the memory circuit.

In Example 5, the subject matter of any one or more of Examples 3-4 optionally include wherein: the first column input is read from the memory circuit in a triangular storage format; and the serial computation output is stored in the memory circuit in a compressed linear storage format.

In Example 6, the subject matter of any one or more of Examples 1-5 optionally include a decomposition control circuit to calculate a matrix decomposition control, wherein the memory access control circuit is further to: obtain the matrix decomposition control; and calculate the parallel computing input based on the matrix decomposition control.

In Example 7, the subject matter of any one or more of Examples 1-6 optionally include wherein the decomposition control circuit is further to obtain a matrix decomposition configuration input, wherein the matrix decomposition control is calculated based on the matrix decomposition configuration details.

In Example 8, the subject matter of any one or more of Examples 1-7 optionally include wherein: the computation separation circuit is further to calculate a dependency clear control based on the parallel MAC single column output; and wherein calculation of the serial computing input is further based on the dependency clear control.

In Example 9, the subject matter of any one or more of Examples 1-8 optionally include wherein the parallel compute circuit further includes a second MAC circuit to: obtain a second column input; and calculate a parallel MAC dual column output based on the second column input.

In Example 10, the subject matter of Example 9 optionally includes wherein the second column input is received from the memory circuit at a second row buffer.

In Example 11, the subject matter of any one or more of Examples 9-10 optionally include wherein the computation separation circuit is further to: obtain the parallel MAC dual column output; and identify an active parallel MAC output based on the parallel MAC single column output and the parallel MAC dual column output; wherein the computation separation circuit calculating the serial computing input is further based on the active parallel MAC output and the parallel MAC dual column output.

In Example 12, the subject matter of Example 11 optionally includes wherein: the parallel compute circuit is further includes a third MAC circuit to obtain a third column input and calculate a parallel MAC multiple column output based on the third column input; and the computation separation circuit identifying the active parallel MAC output is further based on the parallel MAC third column output.

In Example 13, the subject matter of any one or more of Examples 1-12 optionally include wherein: the serial compute circuit includes a serial subtraction circuit to obtain the serial computing input and calculate a serial subtraction output; and the serial computation output is based on the serial subtraction output.

In Example 14, the subject matter of Example 13 optionally includes wherein the serial compute circuit further includes a square root circuit to: obtain the serial subtraction output; and calculate a serial square root output based on the serial subtraction output; wherein calculation of the serial computation output is further based on the serial square root output.

In Example 15, the subject matter of Example 14 optionally includes wherein the serial square root output is based on a Cholesky decomposition.

In Example 16, the subject matter of any one or more of Examples 13-15 optionally include wherein the serial compute circuit further includes an inverse circuit to: obtain the serial subtraction output; and calculate a serial inverse output based on the serial subtraction output; wherein the calculation of the serial computation output is further based on the serial inverse output.

In Example 17, the subject matter of Example 16 optionally includes wherein the serial inverse output is based on a Cholesky decomposition.

In Example 18, the subject matter of any one or more of Examples 16-17 optionally include wherein the serial inverse output is based on a Takagi decomposition.

In Example 19, the subject matter of any one or more of Examples 1-18 optionally include wherein the memory access control circuit is further to: obtain the serial subtraction output; and write the serial subtraction output to a memory.

Example 20 is a method comprising: obtaining a parallel computing input at a parallel compute circuit; calculating a parallel MAC single column output at a first multiply and accumulate (MAC) circuit within the parallel compute circuit, wherein the parallel MAC single column output is calculated based on the parallel computing input and a first column input; invoking a computation separation circuit to provide a serial computing input to a serial compute circuit based on the parallel MAC single column output; and providing a serial computation output calculated by the serial compute circuit based on the serial computing input to the memory access control circuit.

In Example 21, the subject matter of Example 20 optionally includes wherein the parallel computing input is obtained from a memory access control circuit.

In Example 22, the subject matter of any one or more of Examples 20-21 optionally include obtaining the first column input at the memory access control circuit from a memory circuit; and storing the first column output in a first row buffer.

In Example 23, the subject matter of Example 22 optionally includes storing the serial computation output in-place in the memory circuit.

In Example 24, the subject matter of any one or more of Examples 22-23 optionally include reading the first column input from the memory circuit in a triangular storage format; and storing the serial computation output in the memory circuit in a compressed linear storage format.

In Example 25, the subject matter of any one or more of Examples 20-24 optionally include calculating a matrix decomposition control at a decomposition control circuit; and calculating the parallel computing input at the memory access control circuit based on the matrix decomposition control.

In Example 26, the subject matter of any one or more of Examples 20-25 optionally include obtaining a matrix decomposition configuration input at the decomposition control circuit, wherein the matrix decomposition control is calculated based on the matrix decomposition configuration input.

In Example 27, the subject matter of any one or more of Examples 20-26 optionally include wherein the computation separation circuit further calculates a dependency clear control based on the parallel MAC single column output, wherein calculating the serial computing input is further based on the dependency clear control.

In Example 28, the subject matter of any one or more of Examples 20-27 optionally include calculating a parallel MAC dual column output at a second MAC circuit within the parallel compute circuit based on the second column input.

In Example 29, the subject matter of Example 28 optionally includes obtaining the second column input from the memory circuit at a second row buffer.

In Example 30, the subject matter of any one or more of Examples 28-29 optionally include identifying an active parallel MAC output at the computation separation circuit based on the parallel MAC single column output and the parallel MAC dual column output, wherein the computation separation circuit calculating the serial computing input is further based on the active parallel MAC output and the parallel MAC dual column output.

In Example 31, the subject matter of Example 30 optionally includes calculating a parallel MAC third column output at a third MAC circuit within the parallel compute circuit, wherein identifying the active parallel MAC output is further based on the parallel MAC third column output.

In Example 32, the subject matter of any one or more of Examples 20-31 optionally include calculating a serial subtraction output at a serial subtraction circuit within the serial compute circuit based on the serial computing input, wherein the serial computation output is based on the serial subtraction output.

In Example 33, the subject matter of Example 32 optionally includes calculating a serial square root output at a square root circuit within the serial compute circuit based on the serial subtraction output, wherein the serial computation output is further based on the serial square root output.

In Example 34, the subject matter of Example 33 optionally includes wherein the serial square root output is based on a Cholesky decomposition.

In Example 35, the subject matter of any one or more of Examples 32-34 optionally include calculating a serial inverse output at an inverse circuit within the serial compute circuit based on the serial subtraction output, wherein the serial computation output is further based on the serial inverse output.

In Example 36, the subject matter of Example 35 optionally includes wherein the serial inverse output is based on a Cholesky decomposition.

In Example 37, the subject matter of any one or more of Examples 35-36 optionally include wherein the serial inverse output is based on a Takagi decomposition.

In Example 38, the subject matter of any one or more of Examples 20-37 optionally include obtaining the serial subtraction output at the memory access control circuit; and writing the serial subtraction output to a memory.

Example 39 is at least one machine-readable medium including instructions, which when executed by a computing system, cause the computing system to perform any of the methods of Examples 20-38.

Example 40 is an apparatus comprising means for performing any of the methods of Examples 20-38.

Example 41 is at least one non-transitory machine-readable storage medium, comprising a plurality of instructions that, responsive to being executed with processor circuitry of a computer-controlled device, cause the computer-controlled device to: obtain a parallel computing input at a parallel compute circuit; calculate a parallel MAC single column output at a first multiply and accumulate (MAC) circuit within the parallel compute circuit, wherein the parallel MAC single column output is calculated based on the parallel computing input and a first column input; invoke a computation separation circuit to provide a serial computing input to a serial compute circuit based on the parallel MAC single column output; and provide a serial computation output calculated by the serial compute circuit based on the serial computing input to the memory access control circuit.

In Example 42, the subject matter of Example 41 optionally includes wherein the parallel computing input is obtained from a memory access control circuit.

In Example 43, the subject matter of Example 42 optionally includes instructions to cause the computer-controlled device to: obtain the first column input at the memory access control circuit from a memory circuit; and store the first column output in a first row buffer.

In Example 44, the subject matter of Example 43 optionally includes instructions to cause the computer-controlled device to store the serial computation output in-place in the memory circuit.

In Example 45, the subject matter of any one or more of Examples 43-44 optionally include instructions to cause the computer-controlled device to: read the first column input from the memory circuit in a triangular storage format; and store the serial computation output in the memory circuit in a compressed linear storage format.

In Example 46, the subject matter of any one or more of Examples 41-45 optionally include instructions to cause the computer-controlled device to: calculate a matrix decomposition control at a decomposition control circuit; and calculate the parallel computing input at the memory access control circuit based on the matrix decomposition control.

In Example 47, the subject matter of any one or more of Examples 41-46 optionally include instructions to cause the computer-controlled device to obtain a matrix decomposition configuration input at the decomposition control circuit, wherein the matrix decomposition control is calculated based on the matrix decomposition configuration input.

In Example 48, the subject matter of any one or more of Examples 41-47 optionally include instructions to cause the computer-controlled device to calculate a dependency clear control at the computation separation circuit based on the parallel MAC single column output, wherein calculating the serial computing input is further based on the dependency clear control.

In Example 49, the subject matter of any one or more of Examples 41-48 optionally include instructions to cause the computer-controlled device to calculate a parallel MAC dual column output at a second MAC circuit within the parallel compute circuit based on the second column input.

In Example 50, the subject matter of Example 49 optionally includes instructions to cause the computer-controlled device to identify an active parallel MAC output at the computation separation circuit based on the parallel MAC single column output and the parallel MAC dual column output, wherein calculating the serial computing input is further based on the active parallel MAC output and the parallel MAC dual column output.

In Example 51, the subject matter of Example 50 optionally includes instructions to cause the computer-controlled device to calculate a parallel MAC third column output at a third MAC circuit within the parallel compute circuit, wherein identifying the active parallel MAC output is further based on the parallel MAC third column output.

In Example 52, the subject matter of any one or more of Examples 41-51 optionally include instructions to cause the computer-controlled device to calculate a serial subtraction output at a serial subtraction circuit within the serial compute circuit based on the serial computing input, wherein calculating the serial computation output is based on the serial subtraction output.

In Example 53, the subject matter of Example 52 optionally includes instructions to cause the computer-controlled device to calculate a serial square root output at a square root circuit within the serial compute circuit based on the serial subtraction output, wherein the serial computation output is further based on the serial square root output.

In Example 54, the subject matter of Example 53 optionally includes wherein the serial square root output is based on a Cholesky decomposition.

In Example 55, the subject matter of any one or more of Examples 52-54 optionally include instructions to cause the computer-controlled device to calculate a serial inverse output at an inverse circuit within the serial compute circuit based on the serial subtraction output, wherein calculating the serial computation output is further based on the serial inverse output.

In Example 56, the subject matter of Example 55 optionally includes wherein the serial inverse output is based on a Cholesky decomposition.

In Example 57, the subject matter of any one or more of Examples 55-56 optionally include wherein the serial inverse output is based on a Takagi decomposition.

In Example 58, the subject matter of any one or more of Examples 41-57 optionally include instructions to cause the computer-controlled device to: obtain the serial subtraction output at the memory access control circuit; and write the serial subtraction output to a memory.

Example 59 is a hardware accelerated apparatus comprising: means for obtaining a parallel computing input at a parallel compute circuit; means for calculating a parallel MAC single column output at a first multiply and accumulate (MAC) circuit within the parallel compute circuit, wherein the parallel MAC single column output is calculated based on the parallel computing input and a first column input; means for invoking a computation separation circuit to provide a serial computing input to a serial compute circuit based on the parallel MAC single column output; and means for providing a serial computation output calculated by the serial compute circuit based on the serial computing input to the memory access control circuit.

In Example 60, the subject matter of Example 59 optionally includes wherein the means for obtaining a parallel computing input includes a memory access control circuit.

In Example 61, the subject matter of Example 60 optionally includes means for obtaining the first column input at the memory access control circuit from a memory circuit; and means for storing the first column output in a first row buffer.

In Example 62, the subject matter of Example 61 optionally includes means for storing the serial computation output in-place in the memory circuit.

In Example 63, the subject matter of any one or more of Examples 61-62 optionally include means for reading the first column input from the memory circuit in a triangular storage format; and means for storing the serial computation output in the memory circuit in a compressed linear storage format.

In Example 64, the subject matter of any one or more of Examples 59-63 optionally include means for calculating a matrix decomposition control at a decomposition control circuit; and means for calculating the parallel computing input at the memory access control circuit based on the matrix decomposition control.

In Example 65, the subject matter of any one or more of Examples 59-64 optionally include means for obtaining a matrix decomposition configuration input at the decomposition control circuit, wherein the matrix decomposition control is calculated based on the matrix decomposition configuration input.

In Example 66, the subject matter of any one or more of Examples 59-65 optionally include means for calculating a dependency clear control at the computation separation circuit based on the parallel MAC single column output, wherein means for calculating the serial computing input is further based on the dependency clear control.

In Example 67, the subject matter of any one or more of Examples 59-66 optionally include means for calculate a parallel MAC dual column output at a second MAC circuit within the parallel compute circuit based on the second column input.

In Example 68, the subject matter of Example 67 optionally includes means for identifying an active parallel MAC output at the computation separation circuit based on the parallel MAC single column output and the parallel MAC dual column output, wherein the means for calculating the serial computing input is further based on the active parallel MAC output and the parallel MAC dual column output.

In Example 69, the subject matter of Example 68 optionally includes means for calculating a parallel MAC third column output at a third MAC circuit within the parallel compute circuit, wherein identifying the active parallel MAC output is further based on the parallel MAC third column output.

In Example 70, the subject matter of any one or more of Examples 59-69 optionally include means for calculating a serial subtraction output at a serial subtraction circuit within the serial compute circuit based on the serial computing input, wherein the means for calculating the serial computation output is based on the serial subtraction output.

In Example 71, the subject matter of Example 70 optionally includes means for calculating a serial square root output at a square root circuit within the serial compute circuit based on the serial subtraction output, wherein the means for calculating the serial computation output is further based on the serial square root output.

In Example 72, the subject matter of Example 71 optionally includes wherein the serial square root output is based on a Cholesky decomposition.

In Example 73, the subject matter of any one or more of Examples 70-72 optionally include means for calculating a serial inverse output at an inverse circuit within the serial compute circuit based on the serial subtraction output, wherein the means for calculating the serial computation output is further based on the serial inverse output.

In Example 74, the subject matter of Example 73 optionally includes wherein the serial inverse output is based on a Cholesky decomposition.

In Example 75, the subject matter of any one or more of Examples 73-74 optionally include wherein the serial inverse output is based on a Takagi decomposition.

In Example 76, the subject matter of any one or more of Examples 59-75 optionally include means for obtaining the serial subtraction output at the memory access control circuit; and means for writing the serial subtraction output to a memory.

Example 77 is at least one machine-readable medium including instructions, which when executed by a machine, cause the machine to perform operations of any of the operations of Examples 1-76.

Example 78 is an apparatus comprising means for performing any of the operations of Examples 1-76.

Example 79 is a system to perform the operations of any of the Examples 1-76.

Example 80 is a method to perform the operations of any of the Examples 1-76.

The above detailed description includes references to the accompanying drawings, which form a part of the detailed description. The drawings show, by way of illustration, specific embodiments in which the subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope should be determined with reference to the appended claims, along with the full scope of equivalents to which such claims are entitled.

The invention claimed is:
1. A hardware accelerated system comprising:
a parallel compute circuit including a first multiply and accumulate (MAC) circuit to obtain a parallel computing input and calculate a parallel MAC single matrix column output based on the parallel computing input and a first matrix column input;
a computation separation circuit to provide a serial computing input based on the parallel MAC single matrix column output;
a serial compute circuit to obtain the serial computing input and calculate a serial computation output;
a decomposition control circuit to calculate a matrix decomposition control; and
a memory access control circuit to calculate the parallel computing input based on the matrix decomposition control.

2. The system of claim 1, wherein:
the first matrix column input is received at the memory access control circuit from a memory circuit; and
the parallel MAC single matrix column output is stored in a first row buffer.

3. The system of claim 2, wherein the serial computation output is stored in-place in the memory circuit.

4. The system of claim 2, wherein:
the first matrix column input is read from the memory circuit in a triangular storage format; and
the serial computation output is stored in the memory circuit in a compressed linear storage format.

5. The system of claim 2, wherein the parallel compute circuit further includes a second MAC circuit to:
obtain a second matrix column input; and
calculate a parallel MAC dual matrix column output based on the second matrix column input.

6. The system of claim 5, wherein the second matrix column input is received from the memory circuit at a second row buffer.

7. The system of claim 5, wherein the computation separation circuit is further to:
obtain the parallel MAC dual matrix column output; and
identify an active parallel MAC output based on the parallel MAC single matrix column output and the parallel MAC dual matrix column output;
wherein the computation separation circuit calculating the serial computing input is further based on the active parallel MAC output and the parallel MAC dual matrix column output.

8. The system of claim 7 wherein:
the parallel compute circuit is further includes a third MAC circuit to obtain a third matrix column input and calculate a parallel MAC multiple matrix column output based on the third matrix column input; and
the computation separation circuit identifying the active parallel MAC output is further based on the parallel MAC multiple matrix column output.

9. The system of claim 1, wherein the decomposition control circuit is further to obtain a matrix decomposition configuration input, wherein the matrix decomposition control is calculated based on the matrix decomposition configuration input.

10. The system of claim 1, wherein:
the computation separation circuit is further to calculate a dependency clear control based on the parallel MAC single matrix column output; and
wherein calculation of the serial computing input is further based on the dependency clear control.

11. The system of claim 1, wherein:
the serial compute circuit includes a serial subtraction circuit to obtain the serial computing input and calculate a serial subtraction output; and
the serial computation output is based on the serial subtraction output.

12. The system of claim 11, herein the serial compute circuit further includes a square root circuit to:
obtain the serial subtraction output; and
calculate a serial square root output based on the serial subtraction output;
wherein calculation of the serial computation output is further based on the serial square root output.

13. The system of claim 11, wherein the serial compute circuit further includes an inverse circuit to:
obtain the serial subtraction output; and
calculate a serial inverse output based on the serial subtraction output;
wherein the calculation of the serial computation output is further based on the serial inverse output.

14. The system of claim 11 wherein the memory access control circuit is further to:
obtain the serial subtraction output; and
write the serial subtraction output to a memory.

15. A method comprising:
obtaining a parallel computing input at a parallel compute circuit;
calculating a parallel MAC single matrix column output at a first multiply and accumulate (MAC) circuit within the parallel compute circuit, wherein the parallel MAC single matrix column output is calculated based on the parallel computing input and a first matrix column input;
invoking a computation separation circuit to provide a serial computing input to a serial compute circuit based on the parallel MAC single matrix column output;
providing a serial computation output calculated by the serial compute circuit based on the serial computing input to a memory access control circuit;
calculating a matrix decomposition control at a decomposition control circuit; and
calculating the parallel computing input at the memory access control circuit based on the matrix decomposition control.

16. The method of claim 15, further including:
obtaining the first matrix column input at the memory access control circuit from a memory circuit; and
storing the parallel MAC single matrix column output in a first row buffer.

17. The method of claim 16, further including storing the serial computation output in-place in the memory circuit.

18. The method of claim 16, further including:
reading the first matrix column input from the memory circuit in a triangular storage format; and
storing the serial computation output in the memory circuit in a compressed linear storage format.

19. The method of claim 15, further including obtaining a matrix decomposition configuration input at the decomposition control circuit, wherein the matrix decomposition control is calculated based on the matrix decomposition configuration input.

20. The method of claim 15, wherein the computation separation circuit further calculates a dependency clear control based on the parallel MAC single matrix column output, wherein calculating the serial computing input is further based on the dependency clear control.

21. The method of claim 15, further including calculating a parallel MAC dual matrix column output at a second MAC circuit within the parallel compute circuit based on a second matrix column input.

* * * * *